Figure 6:
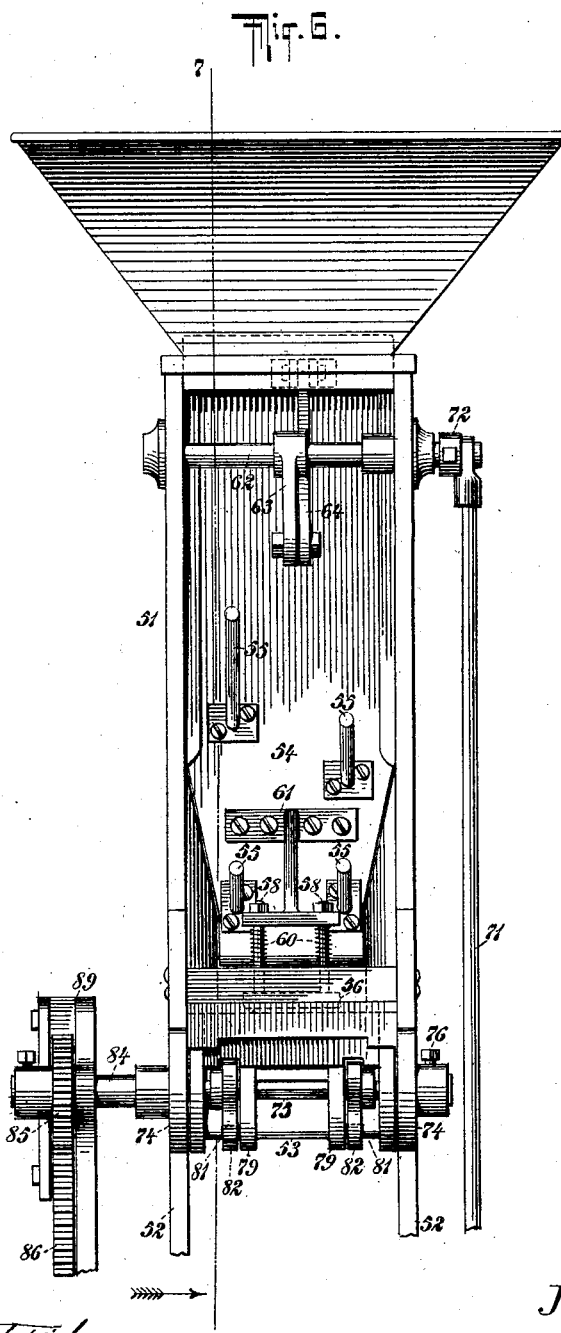

No. 705,449. Patented July 22, 1902.
J. H. SCHMIDT.
CIGAR BUNCHING MACHINE.
(Application filed May 29, 1901.)
(No Model.) 14 Sheets—Sheet 1.
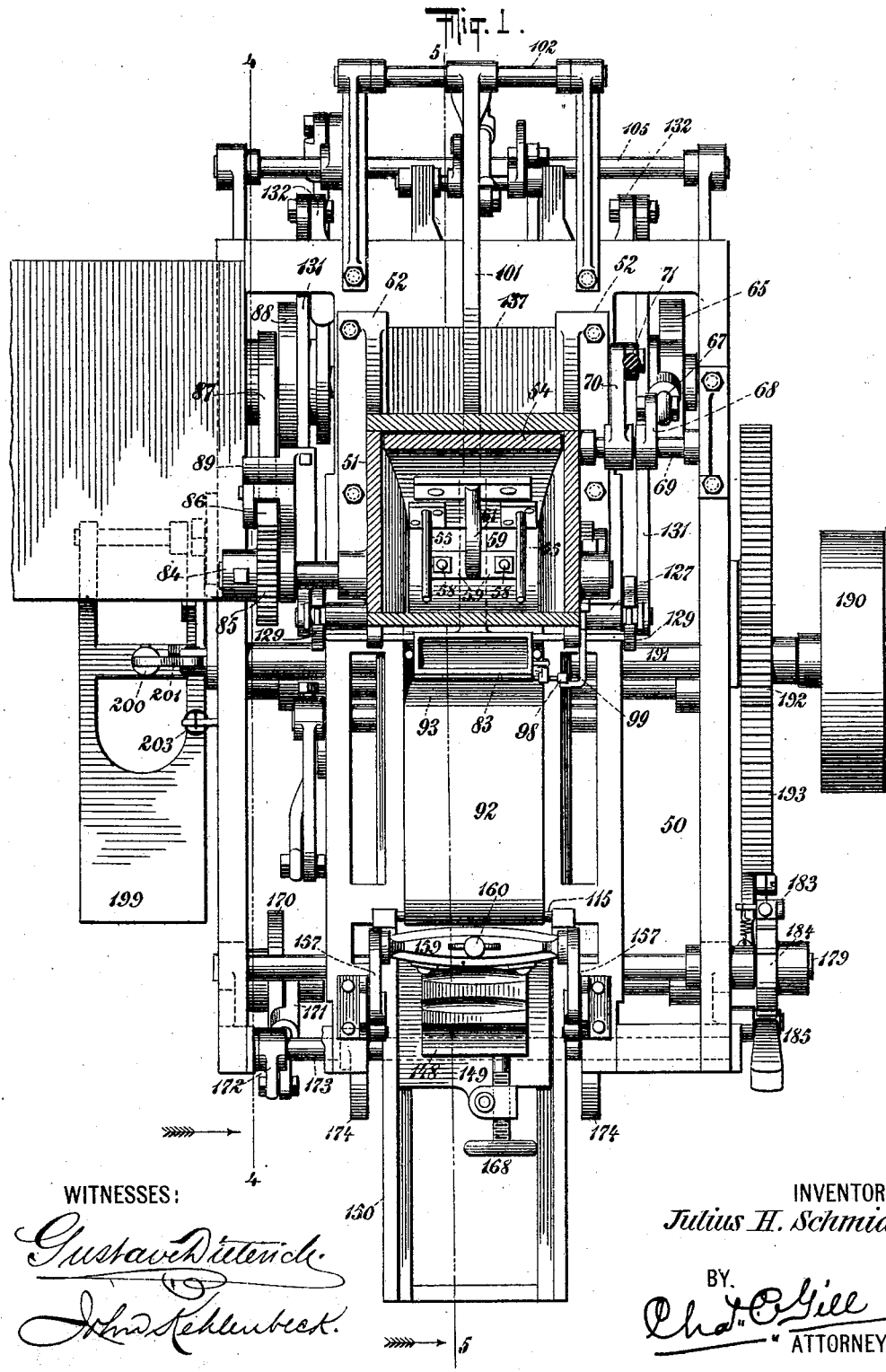
WITNESSES:
Gustave Dieterich
John Kehlenbeck
INVENTOR
Julius H. Schmidt
BY
Chas. O. Gill
ATTORNEY

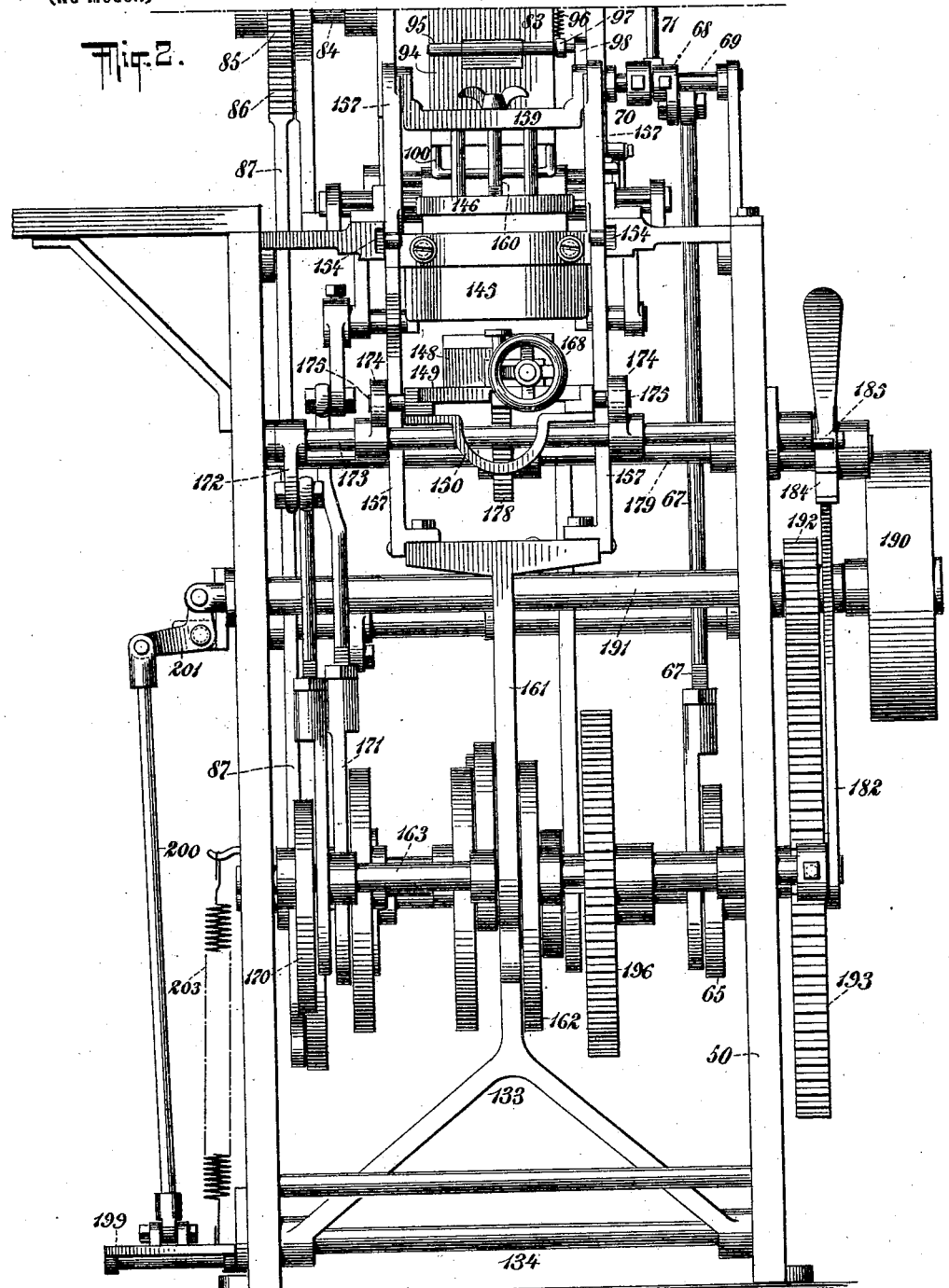

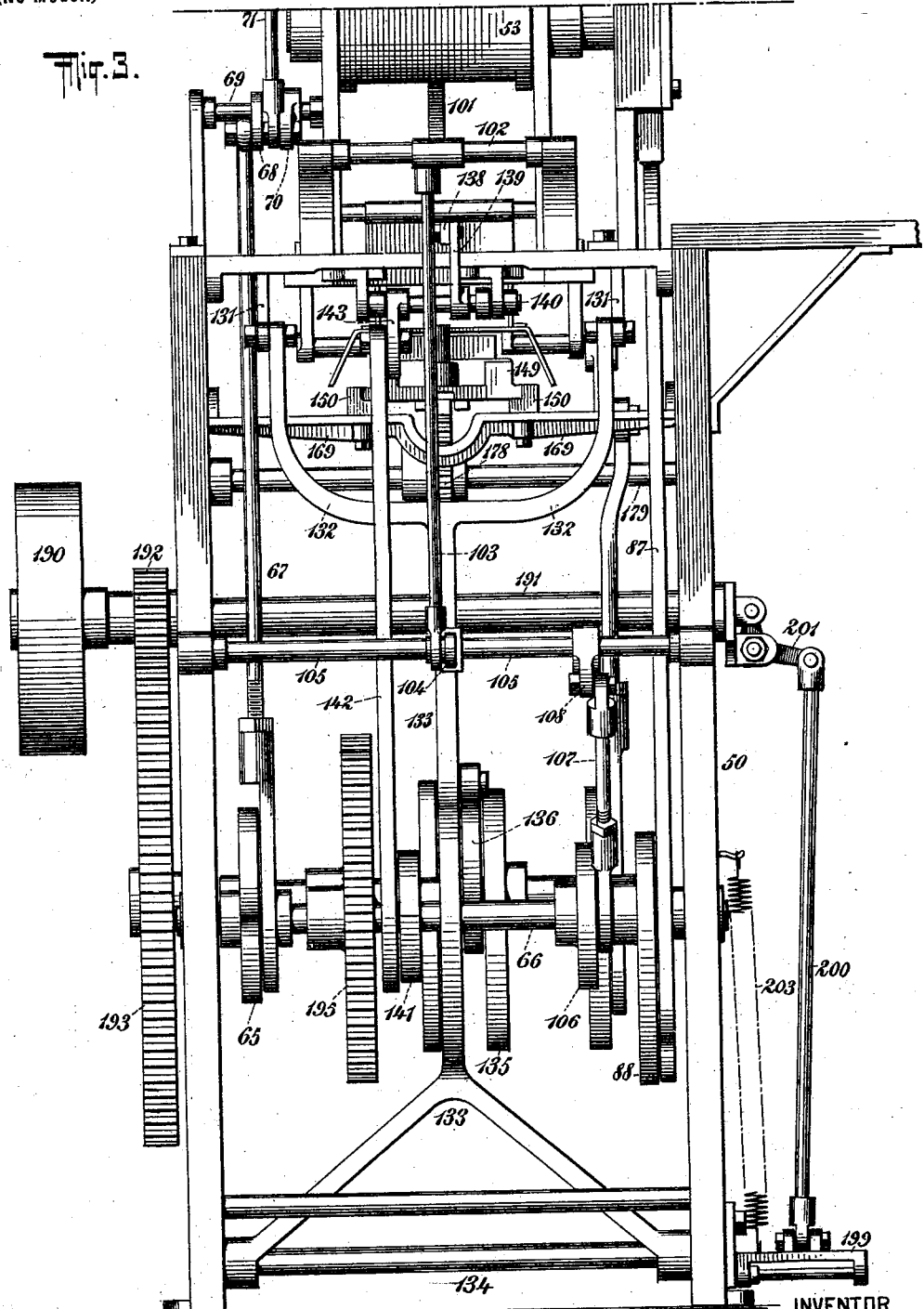

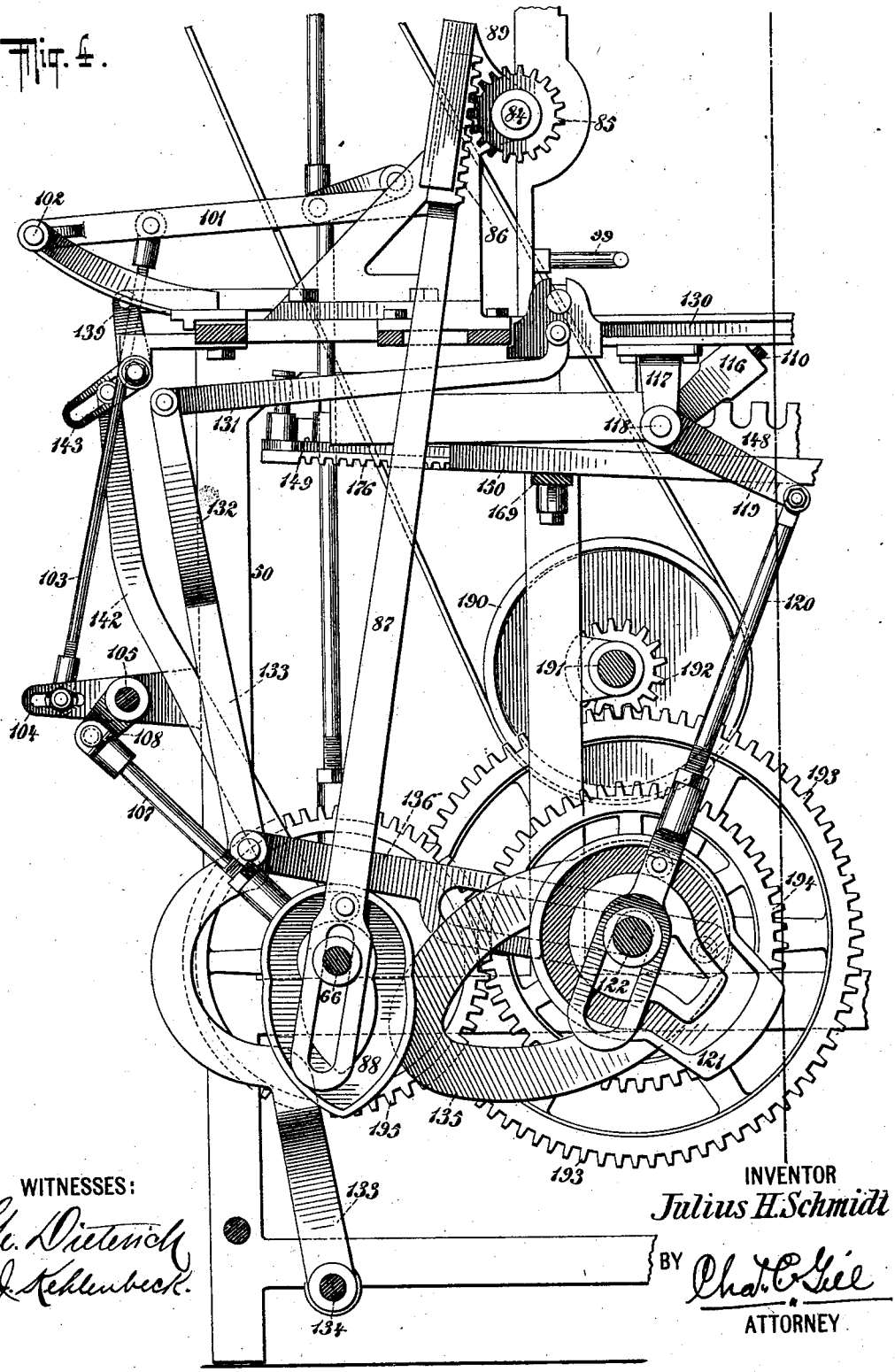

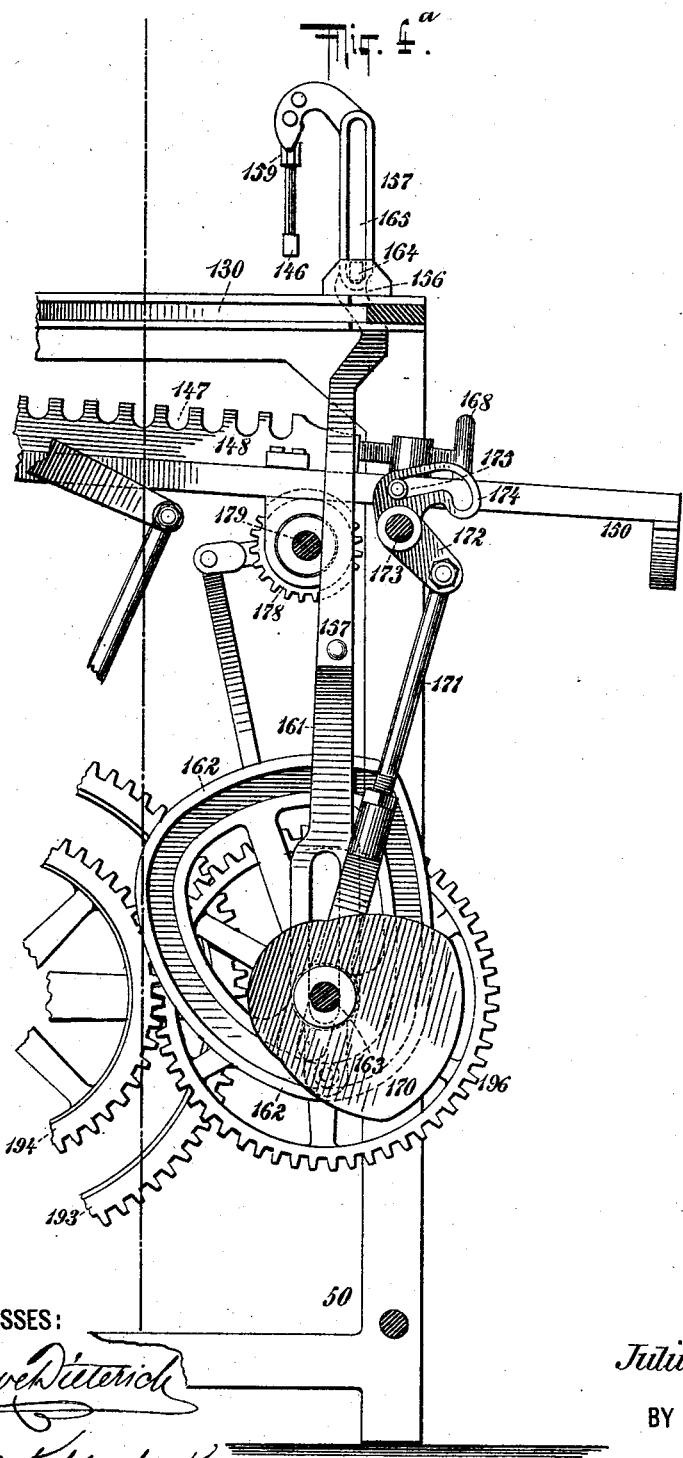

No. 705,449. Patented July 22, 1902.
J. H. SCHMIDT.
CIGAR BUNCHING MACHINE.
(Application filed May 29, 1901.)
(No Model.) 14 Sheets—Sheet 6.
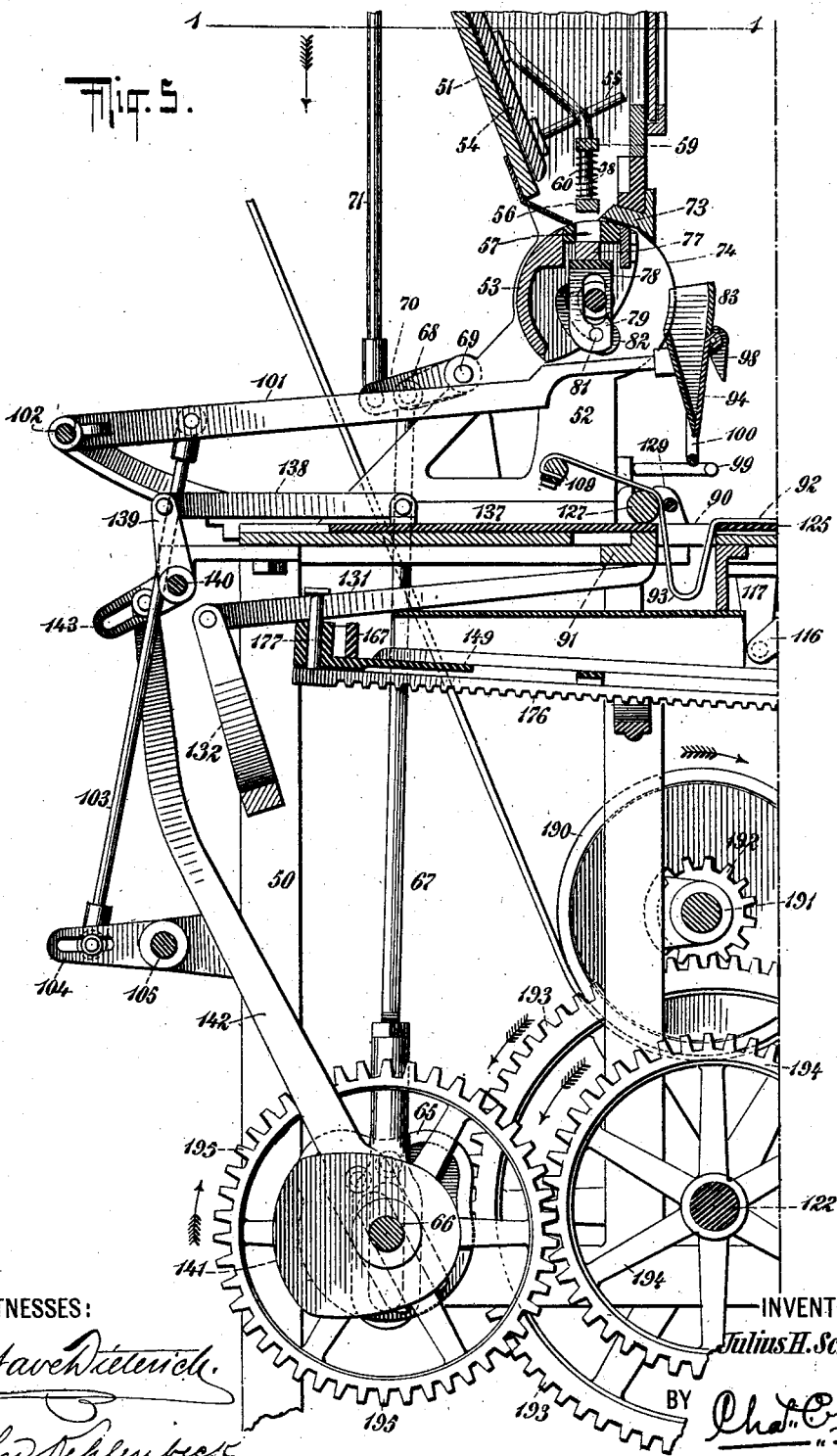

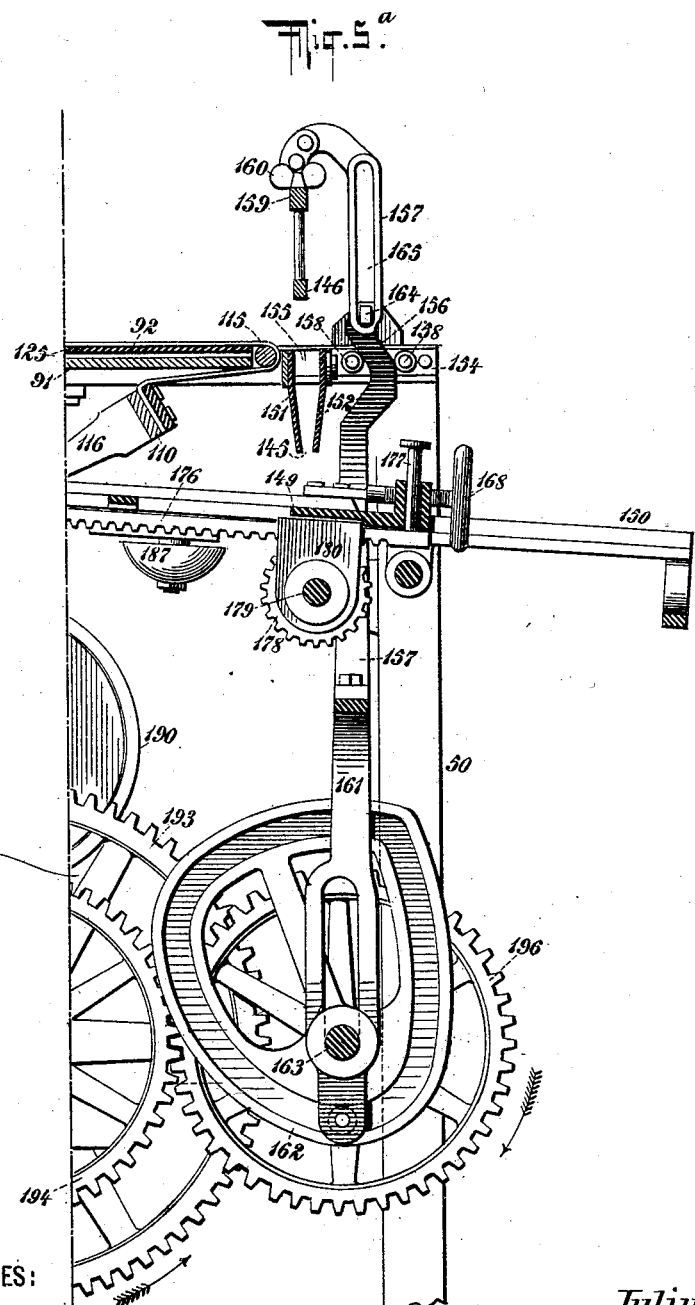

No. 705,449. Patented July 22, 1902.
J. H. SCHMIDT.
CIGAR BUNCHING MACHINE.
(Application filed May 29, 1901)
(No Model.) 14 Sheets—Sheet 8.

WITNESSES:
Gustave Dieterich.
John Kehlenbeck.

INVENTOR
Julius H. Schmidt
BY Chas. C. Gill
ATTORNEY

No. 705,449. Patented July 22, 1902.
J. H. SCHMIDT.
CIGAR BUNCHING MACHINE.
(Application filed May 29, 1901.)

(No Model.) 14 Sheets—Sheet 9.

WITNESSES: INVENTOR
Julius H. Schmidt
BY
ATTORNEY

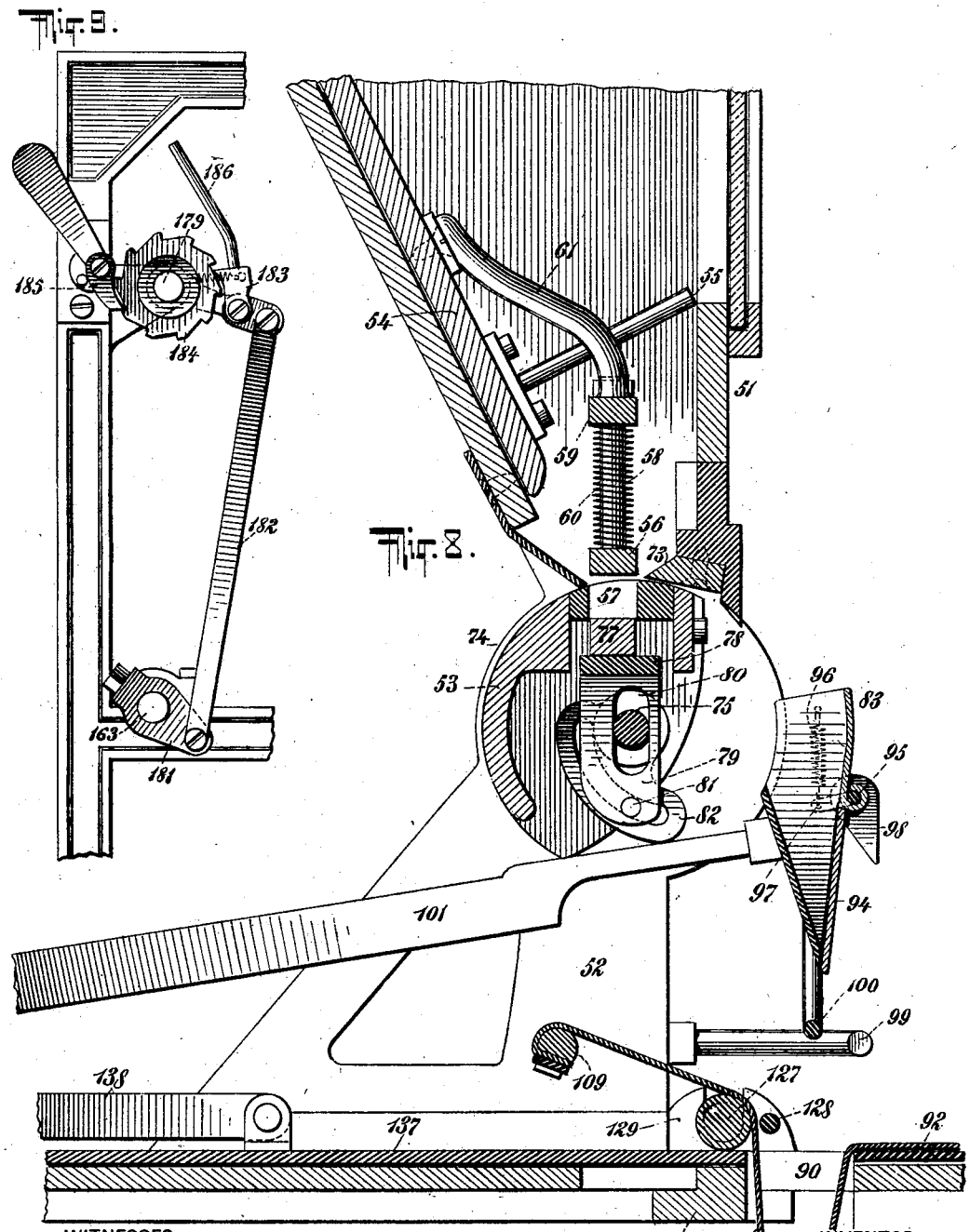

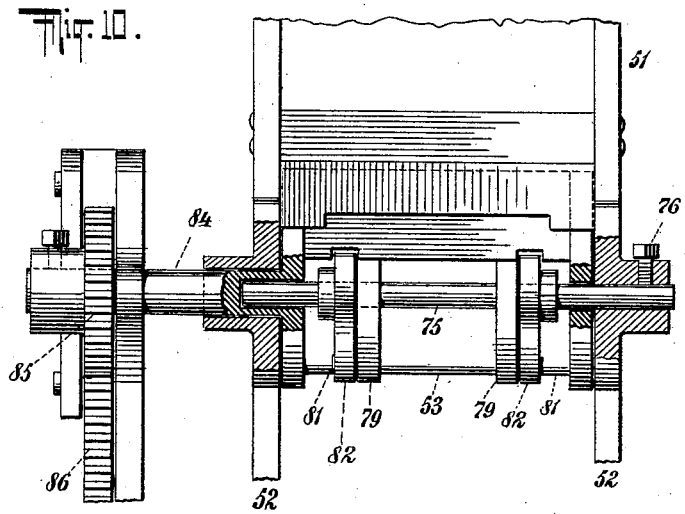
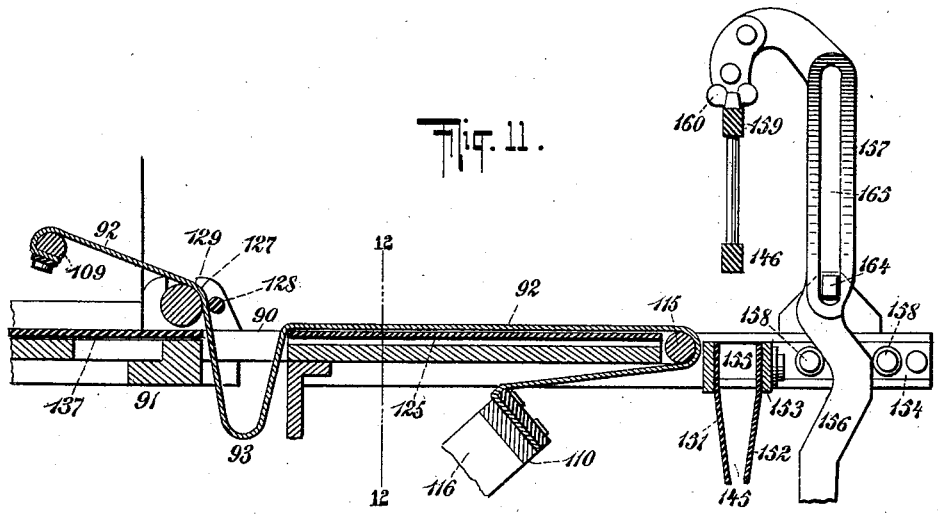
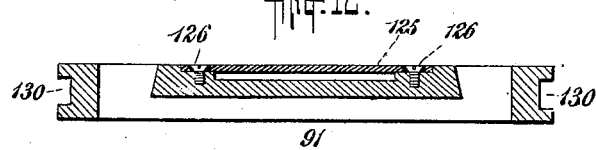

No. 705,449. Patented July 22, 1902.
J. H. SCHMIDT.
CIGAR BUNCHING MACHINE.
(Application filed May 29, 1901.)
(No Model.) 14 Sheets—Sheet 12.
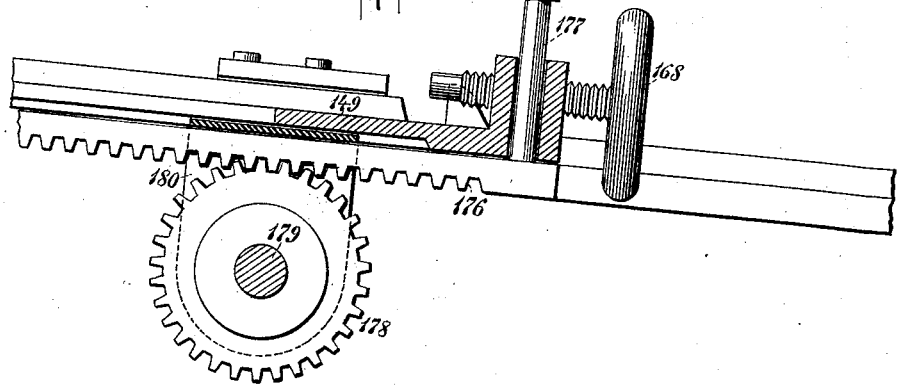
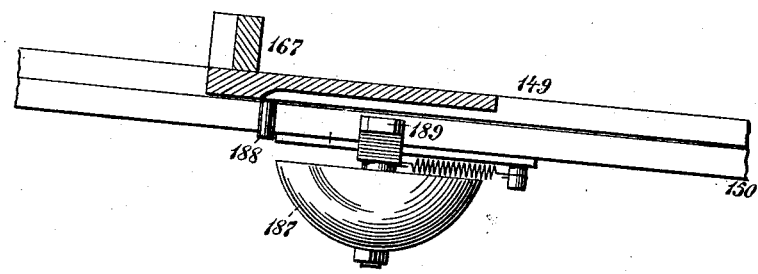
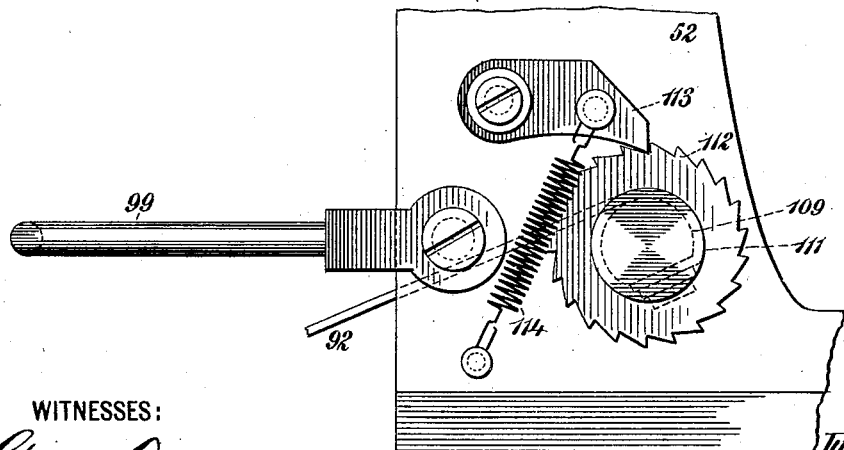
WITNESSES:
Gustave Dieterich
John Kehlenbeck
INVENTOR
Julius H. Schmidt
BY Chas. C. Gill
ATTORNEY

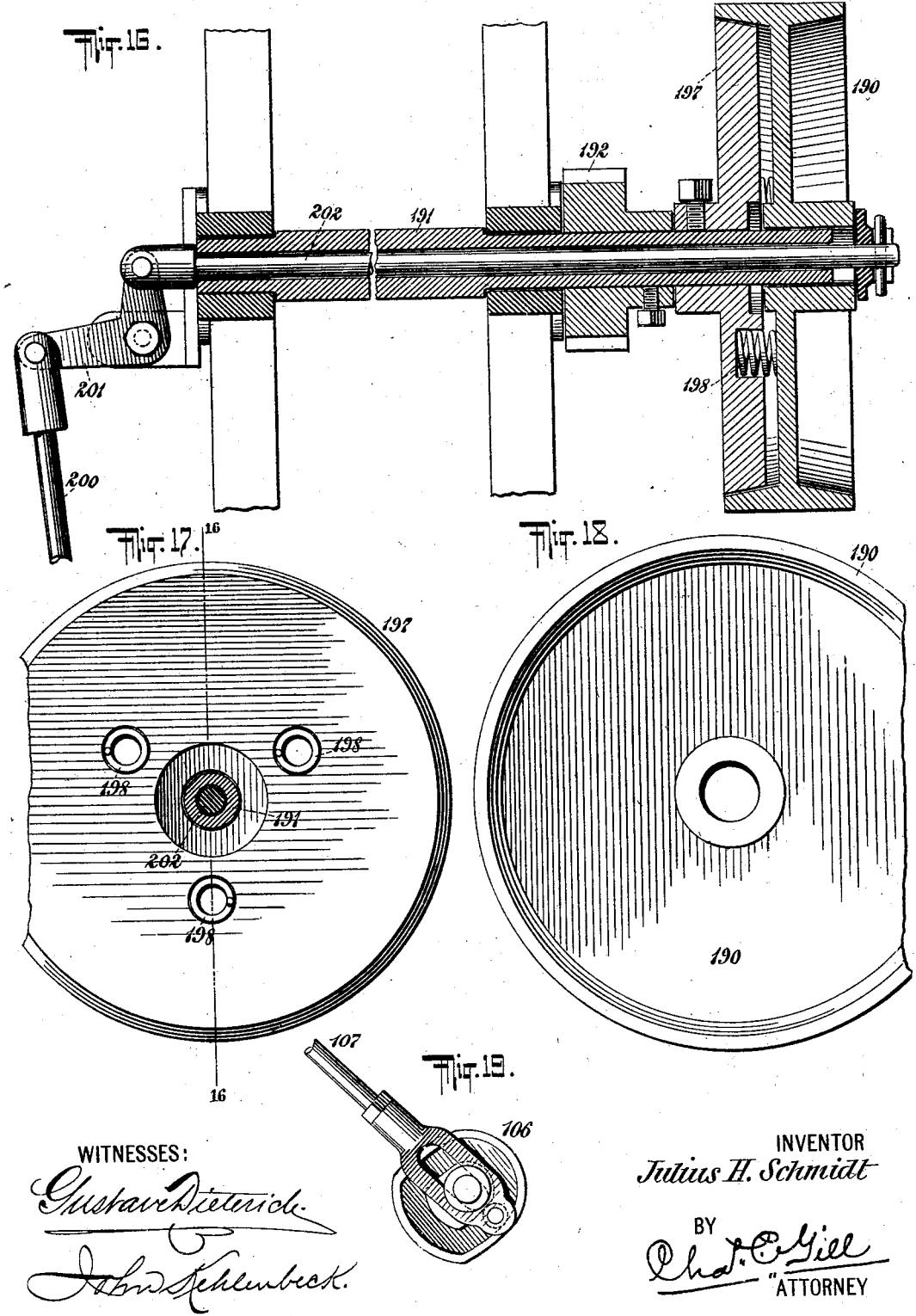

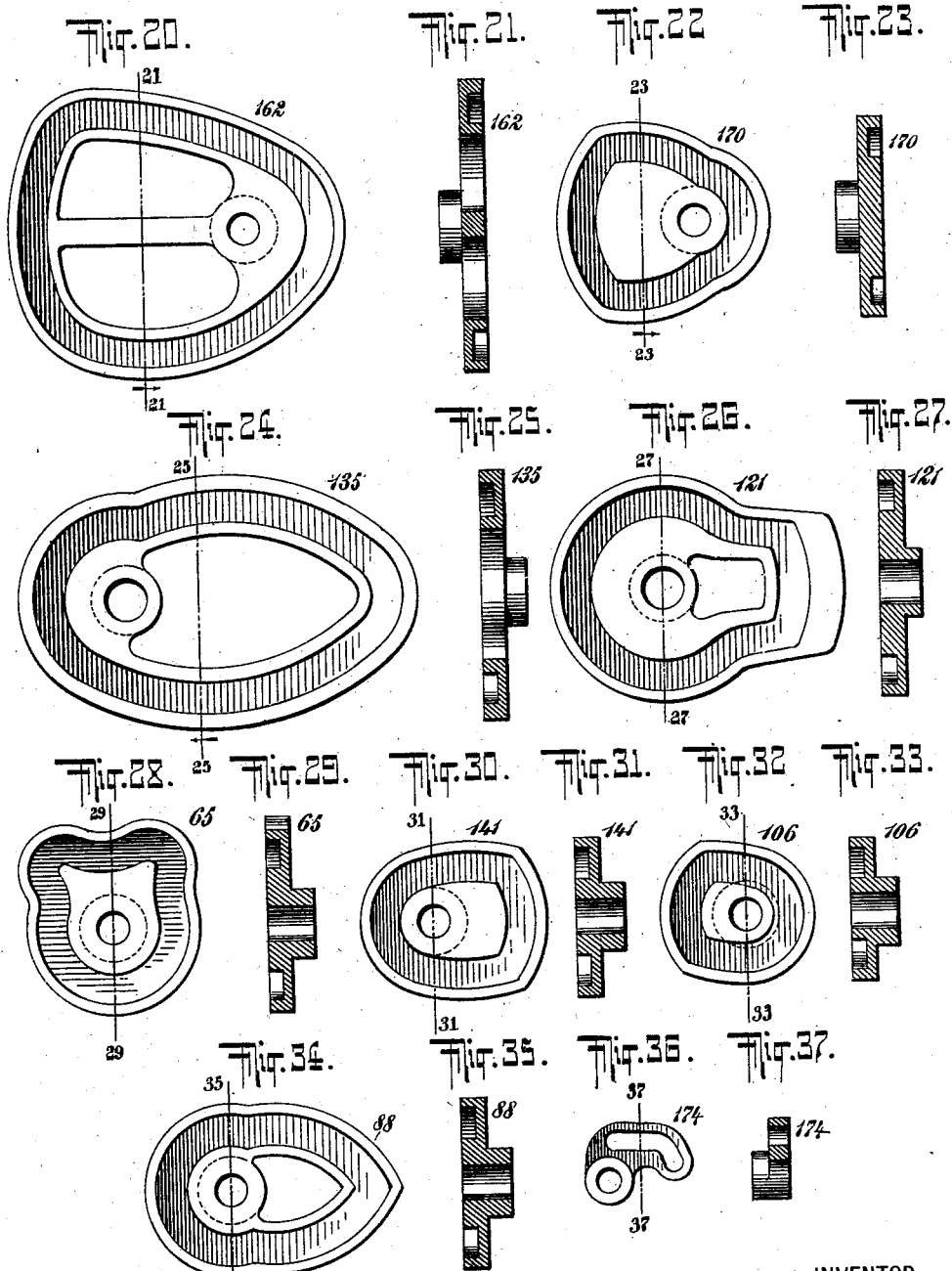

UNITED STATES PATENT OFFICE.

JULIUS H. SCHMIDT, OF BAYONNE, NEW JERSEY, ASSIGNOR TO WILLIAM E. SHARPS, TRUSTEE, OF PHILADELPHIA, PENNSYLVANIA.

CIGAR-BUNCHING MACHINE.

SPECIFICATION forming part of Letters Patent No. 705,449, dated July 22, 1902.

Application filed May 29, 1901. Serial No. 62,367. (No model.)

*To all whom it may concern:*

Be it known that I, JULIUS H. SCHMIDT, a citizen of the United States, and a resident of Bayonne, in the county of Hudson and State of New Jersey, have invented certain new and useful Improvements in Cigar-Bunching Machines, of which the following is a specification.

The invention relates to improvements in cigar-bunching machines; and it consists in the novel features and combinations of parts hereinafter described, and particularly pointed out in the claims.

I present the invention in this application as embodied in a machine possessing a hopper within which the filler-tobacco in bulk is placed and which contains means for feeding downward and preventing the clogging of the tobacco, an oscillatory receiver or charge-carrier located at the discharge end of the hopper, suitable rolling mechanism, a rolling-apron held at both ends and provided with means for taking up the slack in the apron at the proper time, pocket forming and closing mechanism, a slidable mold-block to receive the finished bunches, a vertical funnel into which the bunches are rolled from the rolling-apron and the lower edges of which are adapted to enter the molds in the mold-block, a plunger for pressing the bunches through said funnel and into the molds of the mold-block, and other features, all of which will be hereinafter described, and the novel elements and combinations of which will be pointed out in the claims.

The invention will be fully understood from the detailed description hereinafter presented, reference being had to the accompanying drawings, in which—

Figure 7:
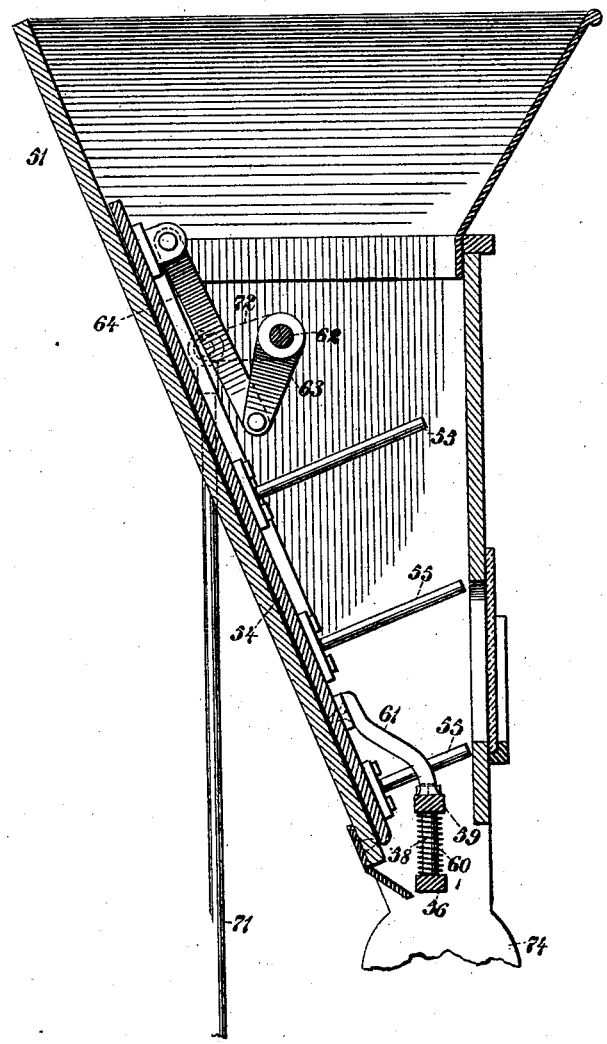

Figure 1 is a top view, partly broken away and partly in section, of a cigar-bunching machine constructed in accordance with and embodying the invention, the sectional portion of this figure being through the hopper on the dotted line 1 of Fig. 5. Fig. 2 is a front elevation of same, a portion of the upper part of the machine being omitted. Fig. 3 is a like view of the rear end of the machine. Figs. 4 and 4ᵃ represent, taken together, a vertical longitudinal section through the machine on the dotted line 4 4 of Fig. 1. Figs. 5 and 5ᵃ, taken together, represent a longitudinal section through the machine on the dotted line 5 5 of Fig. 1. Fig. 6 is an enlarged front elevation of the hopper for holding the filler-tobacco in bulk, the front face of the hopper being omitted for the purpose of disclosing the interior mechanism. Fig. 7 is a vertical section of same on the dotted line 7 7 of Fig. 6. Fig. 8 is an enlarged vertical longitudinal section, partly broken away, through the hopper for the filler-tobacco in bulk, the charge-carrier disposed at the lower end thereof, the means for conveying the separate charges of filler-tobacco from the charge-carrier to the rolling-apron, the means for forming the pocket in the rolling-apron to receive the charge of filler-tobacco, the rolling-bed supporting the said apron, and the plate for closing the pocket formed in said apron. Fig. 9 is an enlarged detached view of a detailed portion of the operative mechanism, this view being taken at the front end of the main supporting-frame of the machine and at the right-hand side of said frame, and the mechanism shown being the ratchet mechanism by which an intermittent motion is imparted to the mold-board which receives the bunches one after another after they are formed. Fig. 10 is a front elevation, partly broken away and partly in section, of the lower end of the hopper for holding the filler-tobacco in bulk with the charge-carrier in position below said end, this view being presented more particularly to illustrate, in connection with Fig. 8, the means for supporting and operating the said charge-carrier. Fig. 11 is a detached central vertical longitudinal section, partly broken away, of the front portion of the bed of the machine, with the parts carried thereby. Fig. 12 is a vertical transverse section through the rolling-bed of the machine on the dotted line 12 12 of Fig. 11. Fig. 13 is a detached view, partly in section, of a portion of the mechanism connected with the slide for holding the intermittently-moving mold-board. Fig. 14 is a detached top view, partly in section, of a portion of the mechanism and showing more particularly the bell mechanism, which is sounded when the mold-board has been filled with bunches. Fig. 15 is a detached view looking at the right-hand side of the machine, of the means provided for winding up the rolling-apron at its inner end. Fig. 16 is a vertical transverse section through a portion of the machine, and is presented to illustrate the clutch mechanism for the power-wheel. Fig. 17 is a detached face view, partly broken away, of the clutch member for engaging the power or belt wheel. Fig. 18 is a like view, partly broken away, of the power or belt wheel. Fig. 19 is a detached view of one of the operative details of the machine, and will be hereinafter referred to; and Figs. 20 to 37, inclusive, are detached views of the various cams forming parts of the operative mechanism of the machine, and said cams will be hereinafter specifically designated by reference-numerals.

In the drawings 50 designates a suitable supporting-frame of any desirable construction, and 51 the feed-hopper for holding the filler-tobacco in bulk, said hopper being of usual funnel-shape form and supported above the rear portion of the main frame 50 upon suitable brackets 52. Below the lower end of the hopper 51 is mounted the oscillatory charge-carrier 53, which is preferably of metal and of segmental outline in cross-section, as illustrated in Figs. 5 and 8. The charge-carrier 53 has imparted to it an oscillatory motion from its receiving position, in Figs. 5 and 8 to its discharging position, hereinafter described, and then back to its receiving position, said charge-carrier not making a complete rotation.

The feed-hopper 51 is more clearly illustrated in Figs. 6, 7, and 8 and is provided along one of its walls with the reciprocatory board 54, carrying the series of pins 55 and plunger 56, said plunger 56 being a bar adapted to the dimensions of the pocket 57 in the charge-carrier 53 and being supported upon rods 58, suspended from the cross-bar 59 and capable of moving upward through apertures in the said cross-bar. Between the cross-bar 59 and plunger 56 are provided upon the rods 58 the coiled springs 60, which exert a downward pressure upon the plunger 56, but permit the said plunger to yield upwardly when the said plunger is pushed downward against the tobacco in the lower end of the hopper 51. The plunger 56 is therefore yieldingly held and is capable of movement vertically independently of the movement which may be imparted to it during the reciprocation of the board 54, carrying said plunger. The cross-bar 59 is connected with the board 54 by means of a suitable bracket-arm 61. The pins 55, carried by the board 54, project outward, so as to be within the body of the filler-tobacco to be held within the hopper 51, and during the vertical motion of the board 54 the said pins serve to keep the filler-tobacco in a substantially light condition, so as to prevent the packing of the tobacco or the clogging of the same within the hopper 51. The purpose of the plunger 56 is to press the lower strata of the filler-tobacco into the pocket 57 of the charge-carrier 53 when the board 54 is moved to its lower position, which is that shown in Figs. 7 and 8, and the special movement of the board 54 and plunger 56 in the operation of charging the pocket 57 of the carrier 53 will be hereinafter more clearly explained.

The board 54 receives its reciprocating motion from the horizontal shaft 62, passing through the hopper 51 and connected, as shown in Fig. 7, by means of the crank 63 and link 64 with said board 54. The shaft 62 has an oscillatory motion imparted to it from the cam 65, Figs. 3, 28, and 29, secured on the rear shaft 66 and connected with said shaft 62 through the medium of the pitman-rod 67, Figs. 3 and 5, lever-arm 68, secured on the rock-shaft 69 and pivotally connected with the upper end of the said rod 67, lever-arm 70, secured on said rock-shaft 69, pitman-rod 71, secured at its lower end to said lever-arm 70, and the crank-arm 72, secured to the aforesaid shaft 62 and pivotally connected with the upper end of said pitman-rod 71. The rotation of the cam 65 imparts a vertical reciprocatory motion to the pitman-rods 67 and 71 and said rods operate through the crank-arm 72 to rock or oscillate the shaft 62, which in turn through the crank-arm 63 and link 64 causes the board 54 to have a sliding or reciprocating motion, said motion being of course imparted to the pins 55 and plunger 56, carried by said board. During the reciprocating motion of the board 54, pins 55, and plunger 56 the tobacco in bulk above the plunger is kept in a loosened condition—that is, against packing—and the tobacco below the plunger 56 is caused to fill the charge-pocket 57 in the oscillatory carrier 53. The timing of the cam 65 is such that the board 54 and plunger 56 will when the charge-carrier 53 is in its receiving position (shown in Fig. 8) descend to their lower position just before the machine comes to a stop, and consequently when the machine does come to a stop the plunger 56 will have descended and pressed some of the tobacco below it into the pocket 57 of the charge-carrier 53. The timing of the cam 65 is also such that when the machine is again started in motion and before the charge-carrier 53 turns its pocket 57 toward the front from the position in which it is shown in Fig. 8 the plunger 56 and board 54 will ascend and again descend, thus giving the plunger 56 two downward movements against the tobacco for filling the pocket 57 of the charge-carrier 53 and whereby the operator can always make sure that the charge-carrier pocket 57 is filled with tobacco before the charge-carrier turns frontward to discharge the tobacco from its pocket 57. When the plunger 56 descends on its second downward movement, it remains in its lower position (shown in Fig. 8) until the charge-carrier 53 moves its pocket 57 frontward to its discharging position, whereby said plunger is utilized to prevent the tobacco in the pocket 57 from being pulled out of the pocket while the carrier 53 is turning frontward. While the carrier 53 is turning its pocket 57 frontward, a wiper 73 (see Fig. 8) prevents any excess of tobacco from being carried forward by the charge-carrier 53, while the plunger 56 at such time prevents the tobacco in the pocket 57 of the charge-carrier from being dragged out of the said pocket during the travel of the latter from below the hopper 51. When the charge-carrier 53 has turned frontward to discharge the contents of the pocket 57, the plunger 56 will, owing to the form and timing of the cam 65, ascend with the board 54, so as to be in its elevated position during the return of the pocket 57 to its receiving position below the hopper 51, and thereupon before the machine comes to a stop the plunger 56 will descend to its lower position, driving some of the tobacco into the pocket 57. The plunger 56 thus makes two descents in filling the pocket 57 of the charge-carrier 53, this being important because thereby the pocket 57 becomes assuredly filled with the tobacco, and the plunger 56 does not have to press so rigidly and firmly against the tobacco as to wedge or cake the tobacco within the said pocket 57. The fact that the plunger 56 is yieldingly backed by the springs 60 is also of advantage, since by reason thereof the said plunger is not liable to cake or pack the tobacco within the pocket 57 of the charge-carrier 53.

The charge-carrier 53 is mounted between the facings 74, forming a part of the supporting-brackets 52 for the hopper 51, and said charge-carrier is loosely mounted upon the transverse shaft 75, which is held stationary, as shown in Fig. 10, by means of a screw 76. The charge-carrier 53 turns on the stationary shaft 75 from its receiving position (shown in Fig. 8) to its discharging position, hereinafter described, and then back to its receiving position, not making a complete rotation. The pocket 57 in the charge-carrier 53 is of elongated form and adapted to hold sufficient filler-tobacco for the formation of one bunch. The bottom of the pocket 57 is formed by a bar 77, Fig. 8, which bar is movable, so as to constitute the means for at the proper time ejecting the charge of tobacco from the said pocket 57. The bar 77 is carried upon a transverse bar 78, whose right-angular end portions 79 contain the elongated openings 80 to pass upon the transverse shaft 75 and to admit of the bar 77 having proper movement to eject the charge of filler-tobacco from the pocket 57. The ends 79 of the transverse bar 78 constitute slotted plates and are adapted to have a sliding motion, said sliding motion being limited by the walls of the slots or openings 80 in said plates. The end plates 79 are provided with the pins 81, Figs. 6, 8, and 10, which are adapted to move within the slots of the stationary cams 82, secured upon the aforesaid stationary shaft 75. The purpose of the cams 82 is, through the medium of the pins 81, to draw the bar 77, forming the bottom of the pocket 57, to its extreme lower position when said pocket is, as shown in Fig. 8, below the hopper 51, and to force said bar 77 to its extreme outward position when the pocket 57 has turned frontward for the purpose of discharging its contents into the receiver 83. The cams 82 thus control the position of the bar 77 constituting the bottom of the pocket 57, and effect the discharge or ejection of the charge of filler-tobacco from the pocket 57, when the charge-carrier 53 is turned frontward into position to deliver the filler-tobacco to the receiver 83, by which at the proper time the said charge of filler-tobacco is conducted to the loop or pocket of the rolling-apron.

The charge-carrier 53 is in the nature of a segment, and is, as above described, loosely mounted upon the stationary shaft 75. At its left-hand end, Figs. 6 and 10, the charge-carrier 53 is formed with the short shaft 84, within which the left-hand end of the stationary shaft 75 is supported, and which shaft 84 is provided on its outer end with the pinion-wheel 85. The pinion-wheel 85 is in mesh with the rack 86 upon the upper end of the rod 87, and by means of the pinion 85 and rack 86 the shaft 84 and charge-carrier 53 have imparted to them a rocking or oscillatory motion, so that said charge-carrier 53 may carry its pocket 57 from its receiving position (shown in Fig. 8) to a position over the charge-receiver 83 (this being the discharging position for the pocket 57) and then back to its receiving position. The rod 87, carrying at its upper end the rack 86 for operating the charge-carrier 53, receives its motion from the cam 88, Fig. 4, secured on the rear shaft 66, hereinbefore referred to. The cam 88 simply imparts to the rod 87 an up-and-down motion, and is so timed that it may operate through the rack 86 and pinion-wheel 85 to turn the charge-carrier 53 from its receiving position to its discharging position and then back to its receiving position, the charge-carrier remaining stationary in its receiving position to receive the charge of filler-tobacco. The charge-carrier 53 will remain in its receiving position until the previous charge of filler-tobacco has been rolled into the binder and the pocket for filler-tobacco has been again formed in the rolling-apron preparatory to the rolling of another bunch. The rack 86 is guided and held against the pinion-wheel 85 by means of an inclosing and protecting frame 89. (Indicated in Fig. 4.)

The cam 88 is shown in detail in Figs. 34 and 35, Fig. 34 being a face view of the cam, and Fig. 35 a vertical section of same on the dotted line 35 35 of Fig. 34.

The receiver 83 to receive the separate charges of filler-tobacco from the charge-carrier 53 is probably more clearly illustrated in Figs. 5 and 8, and the said receiver 83 is adapted to have a substantially vertical movement from its upper receiving position (shown in Figs. 5 and 8) to its discharging position, in which position the lower edges of said receiver 83 are within the recess 90, formed in the top bed-frame 91 of the machine. The purpose of the receiver 83 is primarily to receive when in its upper position the charge of filler-tobacco from the pocket 57 of the charge-carrier 53 and convey the same to the loop or pocket in the rolling-apron 92, which extends over the bed-frame 91 and across the recess 90 therein. The second purpose of the receiver 83 is to press the slack portion of the rolling-apron 92 into the aforesaid recess 90, so that the loop or pocket 93 may, as shown in Figs. 5 and 8, be formed in said apron 92 preparatory to receiving the charge of filler-tobacco for a bunch. The receiver 83 on its downward motion operates to press the slack of the apron 92 downward into the recess 90 to form the pocket 93. The receiver 83 has an open top, solid back and ends, and a hinged front door 94, the latter being swung from the pivot-rod 95 and normally kept in its closed position by means of a spring 96, (shown by dotted lines in Fig. 8,) the upper end of said spring 96 being fastened to the end of the receiver 83, and the lower end of said spring being fastened to a short arm 97, secured upon the right-hand end of the pivot-rod 95. The receiver 83 is substantially wedge-shaped in vertical section, as shown, and the narrow end of said receiver points downward. The spring 96 will keep the door 94 of the receiver 83 closed at all times except when said receiver 83 is reaching its lower position and it becomes necessary that the charge of filler-tobacco therein shall be deposited within the pocket 93 of the rolling-apron 92. The means for opening the door 94 of the receiver 83 comprise the lever-arm 98, secured on the right-hand end portion of the pivoted rod 95, and the stationary finger 99, which is fastened to the right-hand supporting-bracket 52 and has its front end turned inwardly, so that it will stand in a position in the path of the rear inclined edge of the aforesaid lever-arm 98. When the receiver 83 is moved to its lower position, the rear inclined edge of the lever-arm 98 will pass against the front end of the finger 99 and operate as a cam to open the door 94 against the stress of the spring 96, whereby the charge of filler-tobacco within the receiver 83 will be permitted to escape into the pocket 93 of the rolling-apron 92. After the escape of the charge of filler-tobacco from the receiver 83 into the pocket 93 of the apron 92 the said receiver will return to its upper position, and as soon as the lever-arm 98 leaves the finger 99 (during the upward movement of the receiver 83) the spring 96 will close the door 94 and maintain the latter in its closed position until the receiver again descends. The receiver 83 has secured to it a wire frame 100, composed of a horizontal member and two vertical members, the horizontal member being a suitable distance below the lower edge of the receiver 83 and constituting the means for pushing the slack of the apron 92 downward into the recess 90 of the bed-frame 91 in order to form in said apron the pocket or loop 93 to receive the charge of filler-tobacco. The frame 100 is secured to and moves with the receiver 83, and said frame extending below the receiver 83 will precede the receiver 83 on the downward movement of the latter and insure the proper formation of the pocket 93 in the rolling-apron 92 to receive the charge of filler-tobacco from the receiver 83. The receiver 83 will preferably be formed of sheet metal, and the pocket-forming frame 100 will preferably be made of a piece or rod of bent wire. It will be observed upon reference to Fig. 8 that the upper end of the back of the receiver 83 is cut away, so that its upper edge is below the upper edge of the front of said receiver, and the purpose of this formation is to permit the proper discharge of the filler-tobacco from the pocket 57 of the charge-carrier 53 when the latter is turned frontward without danger of any of the tobacco escaping from the top of said receiver 83. It will be observed also that the pivoted rod 95 for the hinged door 94 of the receiver 83 is about on the same horizontal plane with the upper edge of the back of said receiver, and the purpose of this feature of the construction is to compel the discharge of the filler-tobacco from the pocket 57 of the charge-carrier 53 at a point above the door 94, so that the action of the ejector-bar 77 when moving the filler-tobacco from the pocket 57 may not have any influence to open the door 94, the discharging filler-tobacco from the pocket 57 passing against the solid front wall of the receiver 83, or, in other words, against that portion of the receiver 83 where it will have no effect in the way of forcing the door 94 open, it being desirable that the door 94 should remain absolutely closed at all times except when the receiver 83 is in its lower position ready to discharge its contents into the pocket 93 of the rolling-apron 92.

The means for effecting the up-and-down motion of the receiver 83 will now be described.

The receiver 83 is secured upon the front end of the arm 101, which extends rearwardly and substantially centrally over the bed-frame 91 and is secured at its rear end upon the rock-shaft 102, as shown in Figs. 1, 3, and 5. The arm 101, carrying the receiver 83, has a vibratory motion imparted to it by means of the rod 103, whose lower end is pivotally secured to the lever-arm 104, Fig. 5, rigid with the rock-shaft 105, which rock-shaft by means of the said lever-arm 104 and intermediate rod 103 imparts the proper motion to the arm 101, carrying the receiver 83, and the said rock-shaft 105 derives its motion from the cam 106 on the shaft 66, Figs. 3 and 4, through the medium of the connecting-rod 107, engaged at its lower portion by said cam 106 and at its upper end being pivotally connected to the lever-arm 108, secured to the aforesaid rock-shaft 105, as shown in Figs. 3 and 4. The cam 106, operating through the rod 107 and lever-arm 108, imparts to the rock-shaft 105 its oscillatory motion, and said shaft 105, operating through the lever-arm 104 and connecting-rod 103, effects the proper movement of the arm 101 and receiver 83. It will be observed upon reference to Figs. 4 and 5 that the lever-arm 104 is slotted, so that the lower end of the connecting-rod 103 may be adjusted with respect to the distance said rod 103 shall be secured to the lever-arm 104 from the rock-shaft 105, and the purpose of this adjustment of the rod 103 is to regulate the movement of the arm 101 and receiver 83, so that said receiver 83 and its pocket-forming frame 100 shall have just the proper extent of movement. The cam 106 is shown in detail in Figs. 32 and 33, Fig. 32 being a face view of the cam, and Fig. 33 being a vertical section of the same on the dotted line 33 33 of Fig. 32. The cam 106 is also shown in Fig. 19, which illustrates said cam in its relation to the lower end of the connecting-rod 107.

The rolling-apron 92 is of customary flexible material and is secured at its rear end to the rod 109, while at its front end said apron 92 is fastened upon the transverse bar 110, as shown in Fig. 5ª, disposed below the bed-frame 91 of the machine. The rod 109 is mounted in apertures or bearings formed in the supporting-brackets 52 and is capable of rotation therein, so that the said rod 109 may be turned to wind the apron 92 upon itself or to unwind the same therefrom, the purpose of making the rod 109 so as to be capable of rotation being to enable the operator to regulate in a very convenient manner the length of the rolling-apron 92, whereby the said apron 92 may be so adjusted as to its length as to meet the varying requirements for the different sizes of bunches which may be made. If for any reason, such as continued use, the apron 92 should become stretched, the slack of the apron may be taken up by rotating the rod 109. The right-hand end of the rod 109 is formed with a knob or handle 111, as more clearly illustrated in Fig. 15, for the convenient rotation of the said rod 109. The rod 109 is held against improper movement by means of the ratchet 112, Fig. 15, secured thereon and engaged by the pawl 113, the latter being pivoted to the side of the bracket 52 and held against the ratchet 112 by means of the coiled spring 114. The pawl 113 will permit the turning of the rod 109, so as to wind the apron 92 upon itself, but said pawl will prevent any reverse motion of said rod 109. When, therefore, it is desired to unwind any portion of the apron 92 from off of the rod 109 it will be necessary for the operator to elevate the engaging end of the pawl 113 from the ratchet 112, so that the ratchet 112 and rod 109 may be turned freely by hand and be relieved from the influence of the pawl 113. After the proper extent of apron 92 shall have been unwound from the rod 109 the pawl 113 will be permitted to again engage the ratchet 112. The front portion of the rolling-apron 92 passes over a roller 115, secured at the front end of the main bed-frame 91, and thence turns rearwardly to the transverse bar 110, hereinbefore referred to, to which the front end of the said rolling-apron is secured. The transverse bar 110 has its ends turned downward and rearward at right angles to the length of the said bar 110, and said ends (numbered 116) are pivotally secured in the lower ends of hangers 117, which are rigid with the bed-frame 91 and which permit the transverse bar 110 to have a limited oscillatory motion when desired. The left-hand end 116 of the transverse bar 110 at its pivot numbered 118, Fig. 4, is provided with a crank-arm 119, which is operated to impart the proper motion to the transverse bar 110 by means of the rod 120 and cam 121, the latter being secured upon the shaft 122 and operating to impart an up-and-down motion to the said rod 120, whereby the latter, through the crank-arm 119, is enabled to turn the transverse bar 110 upward toward the rear of the machine or downwardly and slightly frontwardly from that position during the operation of rolling a bunch, as will be hereinafter more fully explained. The cam 121 is shown in detail in Figs. 26 and 27, Fig. 26 being a face view of the cam, and Fig. 27 a vertical section of the same on the dotted line 27 27 of Fig. 26. When during the operation of the machine the apron 92 is in the usual manner rolling the bunch toward the front end of the machine, the transverse bar 110 will move slightly upward and rearward under the action of the cam 121 for the purpose of keeping the front portion of the said apron 92 in a substantially taut condition, and when the bunch has reached the front end of the rolling-table and is about to be discharged therefrom the said transverse bar 110 will turn downward and frontward to a limited extent in order to slacken the apron 92.

The rolling-apron 92 is normally greater in length than the distance between the rod 109 and transverse bar 110, so that the frame 100, carried by the receiver 83, may be enabled at the proper time to form the pocket or loop 93 in said apron.

The apron 92 is disposed upon the rolling-bed 125, which consists of a thin sheet-steel plate supported at its longitudinal edges only upon the bed-frame 91, as shown in Figs. 11 and 12. The bed-frame 91 is recessed below the rolling-bed 125, so that there may be sufficient space below said rolling-bed to permit the latter to yield downward to a limited extent during the rolling of the cigar-bunches over the same. The rolling-bed 125 is held by screws 126, Fig. 12, upon the bed-frame 91, and the holes in said rolling-bed 125, through which the screws 126 pass, are slightly larger than the diameter of the head of the screws in order that the rolling-bed 125 may yield downward slightly along its central portions during the rolling of the cigar-bunches. The rolling-bed 125 is thus a yielding bed, and I regard this feature of the construction as of great importance, since I have discovered that by means of this slightly, yielding rolling-bed I am enabled to make bunches of great uniformity in consistency. The presence of the yielding rolling-bed 125 avoids the formation of unduly hard bunches, and I have discovered that with the use of the machine made the subject of this application I am enabled to roll what are commonly called "soft" bunches.

The rolling-apron 92 is employed in connection with the transverse roller 127 and is kept against said roller 127 by means of the small rod or roller 128, Fig. 11, these rollers 127 and 128 being familiar in the art to which this invention relates. The rollers 127 128 are mounted in the slide-bearings 129, which are guided in grooves 130, Fig. 4, formed in the edges of the bed-frame 91. The slide-bearings 129 have simply a direct longitudinal motion along the edges of the bed-frame 91, so as to carry the roller 127 frontward over the rolling-bed 125 and then backward to its normal position in the rear of the recess 90, formed in the bed-frame 91. The means for operating the slide-bearings 129 are probably more clearly illustrated in Figs. 1, 3, and 4, in which it will be seen that each slide-bearing 129 has connected with it an arm 131, said arms 131 being disposed one at each side or edge of the bed-frame 91 and extending rearwardly to the upper ends of the arms 132, Fig. 3, of the frame 133, which is pivotally secured upon the rod 134, near the floor, and is adapted to have a rocking or vibratory motion on said rod. The frame 133 receives its motion from the middle shaft 122 through the medium of the cam 135, secured on said shaft 122, and the connecting-rod 136, which is engaged at one end by said cam 135 and at its rear end is pivotally secured to the said frame 133. The said cam 135 is shown in detail in Figs. 24 and 25, Fig. 24 being a face view of the cam and Fig. 25 a vertical section of same on the dotted line 25 25 of Fig. 24. The cam 135, in connection with the rod 136, imparts a rocking motion to the frame 133, and this frame 133 during its motion toward the front of the machine will, through the rods 131 and slide-bearings 129, move the roller 127 frontward along the rolling-bed 125 for the purpose of rolling the bunch and discharging the same over the front end of said rolling-bed and over the roller 115 at the front edge of the said bed, while during the movement of said frame 133 toward the rear of the machine the said frame, operating through the said rods 131 and slide-bearings 129, will pull the roller 127 back to its normal position in the rear of the recess 90 in the bed-frame 91.

The timing of the frame 133 and cam 135 is such that the roller 127 will not start forward until after the receiver 83 has delivered the charge of filler-tobacco to the pocket 93 in the apron 92 and has ascended clear of said apron nor until the sliding plate 137, hereinafter described, has advanced to close the pocket 93 of the apron 92 upon the charge of filler-tobacco deposited in said pocket by the receiver 83.

The plate 137 is mounted upon the bed-frame 91 in the rear of the recess 90, formed in said bed-frame to receive the pocket 93 of the rolling-apron 92, and said plate 137 is simply a flat plate disposed upon the bed-frame 91 between the supporting-brackets 52, and the said plate 137 has simply a sliding movement toward the front and then back toward the rear on said bed-frame 91. It will be observed upon reference to Figs. 8 and 11 that the plate 137 when in its normal at-rest position is at the rear edge of the recess 90 in the bed-frame 91. After the charge of filler-tobacco has been delivered by the receiver 83 into the pocket 93 of the rolling-apron the operator will, as usual, place the binder upon the apron 92 in such position that its edge will turn slightly into the pocket 93 of said apron, and when this has been done the plate 137 will move frontward and close the pocket 93 upon the charge of filler-tobacco and cause the aforesaid edge of the binder to become pinched between the folds of the apron 92 by the closing of said pocket 93. The movement forward of the plate 137 to close the pocket 93 of the apron 92 takes place before the roller 127 starts forward, and said plate 137 remains in its frontward position, holding the pocket 93 closed until the roller 127 has started forward and is in a position to take its place over the pocket 93 and travel onward in advance of the charge of filler-tobacco confined in said pocket, whereupon the plate 137 will move rearward, so as to release the pocket 93 with the charge of filler-tobacco therein from the recess 90 in the bed-frame 91. The plate 137 is about on the same horizontal plane with the rolling-bed 125, and when said plate 137 moves forward to press the folded portions of the rolling-apron against the rear edge of the said rolling-bed 125 the forward motion of the plate 137 by closing the upper edge of the pocket 93 on the rear edge of the binder prevents the said binder from losing its position or being moved from correct position by the advancing roller 127, the said binder being held by the plate 137 until the roller 127 has moved forward to a sufficient extent to control the same.

The means for imparting movement to the pocket-closing plate 137 are illustrated in Figs. 3 and 5, in which it will be seen that to the upper surface of the plate 137 is pivotally secured a link 138, whose rear end is pivotally secured to the crank-arm 139, rigid upon the rock-shaft 140, which rock-shaft during its movement operates to slide the plate 137, and itself is operated from the rear shaft 66 by means of the cam 141 on said shaft, and the rod 142, whose lower end is engaged by said cam 141 and whose upper end, as shown in Fig. 5, is secured to a crank-arm 143, which extends rearward from the aforesaid rock-shaft 140. The cam 141, operating through the rod 142 and crank 143, rocks the shaft 140 toward the front and then back toward the rear, and this movement of the rock-shaft 140 effects through the crank-arm 139 and link 138 the frontward and backward sliding movement of the plate 137. The cam 141 is shown in detail in Figs. 30 and 31, Fig. 30 being a face view of the cam and Fig. 31 being a vertical section of same on the dotted line 31 31 of Fig. 30.

The cigar-bunches, as they are one after another, by means of the roller 127, moved over the roller 115 at the front end of the rolling-bed 125, pass into the funnel 145, located at the front end of the machine, and are by means of the plunger 146 pressed downward through said funnel and into the individual molds 147 of the wooden mold-board 148, which mold-board 148 is disposed longitudinally below the front portion of the bed-frame 91 of the machine and secured in a detachable manner upon the slidable frame 149, Figs. 1, 2, and 5, this frame 149 being supported upon the guiding-frame 150 therefor and being adapted to have an intermittent forwardly-traveling motion, so that as each mold 147 of the moldboard 148 receives a bunch from the funnel 145 the mold-board 148 may move one step forward, so as to present an empty mold 147 below the funnel 145.

The funnel 145 comprises the corresponding thin steel plates 151 and 152, the plate 151 being stationary or rigidly secured, while the plate 152 is secured to the cross-bar 153, carried by the slide 154, these slides 154 being adapted to travel in guiding-grooves 155 formed in the bed-frame, as shown in Figs. 2, 5$^a$, and 11. The slides 154, carrying the front funnel-plate 152, have a limited horizontal motion, so as to be capable of moving the said plate 152 toward and from the other funnel-plate 151 under the action of the cams 156, formed on the vertical rods 157, Figs. 4$^a$, 5$^a$, and 11, which rods 157 carry the plunger 146 and are adapted to have a vertical movement, as hereinafter explained, during which movement the aforesaid cams 156, operating against the rollers 158, carried by the slides 154, operate to move said slides horizontally, so as to carry the funnel-plate 152 toward and from the funnel-plate 151. The rods 157 are connected together at their upper ends by means of the cross-bar 159, from which is suspended, Fig. 2, the aforesaid plunger 146, the latter being adjustable by means of the vertical screw-rod 160. The lower ends of the vertical rods 157 are connected together, as shown in Fig. 2, by means of the upper horizontal end of the rod 161, whose lower end is engaged by the cam 162, secured upon the front shaft 163, the purpose of the cam 162 being, through the rod 161, to impart the proper vertical movement to the rods 157 and the parts carried thereby. The cam 162 is shown in detail in Figs. 5$^a$, 20, and 21, Fig. 20 being a face view of the cam and Fig. 21 a vertical section of the same on the dotted line 21 21 of Fig. 20. The arms 157 are during their vertical movement guided and controlled by means of studs 164, Figs 5$^a$ and 11, which enter the elongated slots 165, formed in said arms 157, and the lower end of the rod 161, to which said arms 157 are connected, is guided at its lower end, as shown in Fig. 5$^a$, by means of a vertical slot 166 and shaft 163, said shaft passing through said slot 166, and thereby operating to confine the rod 161 in position.

When the bunch is rolled from over the rolling-bed 125 into the funnel 145, the plunger 146 will be in its upper position shown, and the front funnel-plate 152 will be in its front position opening the lower end of the funnel, as shown in Fig. 11, and when it is desired that the plunger 146 shall press the bunch from the lower end of the funnel 145 and into one of the molds 147 of the mold-board 148 the plunger 146 will descend (due to the action of the cam 162 on the shaft 163) and effect this operation in the manner hereinafter described with reference to the movements of the said moldboard 148.

The mold-board 148 is the usual wooden mold-board used by manufacturers of cigars for holding bunches preparatory to the application to the bunches of cigar-wrappers, and this mold-board 148 is clamped upon the frame 149 between the vertical rear end 167 of said frame 149, Figs. 5 and 14, and the point of the clamping-screw 168, Figs. 1, 2, 5$^a$, and 13, which clamping-screw 168 passes through a threaded lug forming a part of the frame 149 and serves to press against the front end of the mold-board 148 so as to bind said mold-board against the aforesaid rear end 167 of the said frame 149. The mold-board 148 is detachable by loosening the screw 168. The mold-board 148 and frame 149 are together adapted to have an intermittent motion upon the guiding-frame or tramway 150. The guiding-frame or tramway 150 is stationary, with the exception that it is adapted to have a pivotal movement, being held at its rear end, as shown in Fig. 3, upon a transverse bar 169, which is pivoted at its ends, and thereby permitted to have a rocking or pivotal motion. The pivotal motion of the frame 150 is simply to carry the mold-board 148 upward to the lower end of the funnel 145 and then downward from said funnel, and this movement of the frame 150 is accomplished from the front shaft 163 through the medium of the cam 170 thereon, Figs. 2, 4$^a$, 22, and 23, the pitman-rod 171 engaged by said cam 170 and connected at its upper end with the crank-arm 172, the rock-shaft 173, carrying said arm 172, and the cams 174, Figs. 2, 4$^a$, 36, and 37, which are secured upon the rock-shaft 173 and engage the pins 175, secured to opposite edges of the said guiding-frame or tramway 150. When the shaft 163 and cam 170 are in motion, a vertical motion will be imparted to the rod 171, and this rod will impart a rocking motion to the shaft 173, which through the cams 174 and pins 175 will operate to elevate and lower the front end of the frame 150, together with the mold-board 148 and sliding frame 149, carried by said frame 150.

The means for imparting the intermittent traveling motion to the mold-board 148 and its sliding frame 149 will now be described. To the lower side of the sliding frame 149 is suspended the longitudinal rack-bar 176, Figs. 5, 5ª, and 13, this rack-bar 176 being loosely held to the frame 149 by means of the vertical pins 177, located one at the front end and the other at the rear end of said frame 149. The rack-bar 176 is engaged by the gear-wheel 178, secured on the transverse shaft 179, Figs. 2, 4ª, 5ª, and 13, said rack-bar 176 being held in constant engagement with said gear-wheel 178 by means of the strap 180, which passes over the top of the rack-bar 176 and engages the shaft 179. The strap 180 allows the rack-bar 176 to travel along on the top of the gear-wheel 178, but prevents said rack-bar from ascending from said gear-wheel. In view of the fact that the tramway or guiding-frame 150, sliding frame 149, and mold-board 148 have a tilting movement upward and downward, it is necessary that the rack-bar 176 shall remain in engagement with the sliding frame 149, but be prevented from losing its connection with the gear-wheel 178, and it is for this reason that the strap 180 is provided to hold the rack-bar 176 against the gear-wheel 178 and also that the ends of the rack-bar 176 are loosely connected with the frame 149 by means of the vertical pins 177, which may have a limited sliding movement through the apertures receiving them in the frame 149. When the frame 149 is tilted upward with the tramway 150, the rack-bar 176 is not affected thereby, since the frame 149 slides upward on the pins 177 without pulling against the said rack-bar. The rotation of the shaft 179 and pinion 178 results, acting against the rack-bar 176, in moving the frame 149 and mold-board 148, and the shaft 179 has an intermittent motion imparted to it from the front shaft 163, Figs. 2, 4ª, and 9, through the medium of the crank 181, Fig. 9, secured on the right-hand end of the said shaft 163, the connecting-rod 182 connected with said crank, and the spring-pawl 183 connected with said rod 182 and being in engagement with the ratchet-wheel 184, secured upon the right-hand end of said shaft 179, which carries the gear-wheel 178. Each rotation of the shaft 163 operates through the rod 182 and ratchet 184 to move the sliding frame 149 and mold-board 148 a sufficient distance to carry one mold 147 of said mold-board from below the funnel 145 and to bring another mold 147 below said funnel 145. The ratchet 184 is equipped with a weighted pawl 185, Fig. 9, which serves to prevent reverse motion in said ratchet, and the pawl 183 is provided with a handle-rod 186, as shown in Fig. 9. After the sliding frame 149 has reached its extreme frontward position the filled mold-board 148 is removed, and an empty mold-board of the same kind is clamped upon the said frame 149, and thereupon it will be desirable to move the frame 91, carrying the new mold-board backward below the bed-frame 149 of the machine, and when this is to be done the operator will turn the pawls 183 and 185 from the ratchet-wheel 184 and simply then press the frame 149 rearward, there being under such condition no resistance to such movement of said frame 149, the shaft 179 being then disconnected from the front shaft 163 of the machine.

During the operation of the machine the sliding frame 149 and mold-board 148 will, step by step, be moved frontward until all of the molds 147 in said board have become filled with bunches received from the funnel 145, and as a warning to the operator I provide a bell 187, Figs. 5ª and 14, which will be sounded when the sliding frame 149 is reaching its front position by means of the pin 188, Fig. 14, passing against and beyond the bell-hammer arm 189. The bell 187 is of ordinary character, and its employment is simply to warn the operator when to stop the machine, remove the mold-board 148, and supply a new mold-board to the machine.

As may be seen on reference to Figs. 4, 4ª, 5, and 5ª, the machine in its lower portion is provided with three parallel main shafts, numbered 66, 122, and 163, from which the operative parts of the machine derive their movement. The machine will be driven by power applied to the power or belt wheel 190, Figs. 5, 16, and 18, mounted upon an upper shaft 191, upon which is secured the pinion-wheel 192, which is in constant gear with the large gear-wheel 193, secured upon the middle shaft 122. This middle shaft 122 receives its motion from the large gear-wheel 193 and is provided with a gear-wheel 194, which is in constant mesh with the gear-wheel 195 on the rear shaft 66 and the gear-wheel 196 on the front shaft 163. The shafts 163 and 66 receive their motion from the middle shaft 122 through the said intermeshing gears 194, 195, and 196.

The power or belt wheel 190 is free to slide upon the shaft 191, as shown in Fig. 16, and is employed in connection with a clutch member 197, which is rigidly fixed upon the shaft 191, and between which and the wheel 190 are arranged the coiled springs 198, whose tension is normally exerted to push the wheel 190 from the clutch member 197, so as to cut off the power from the machine. The belt-wheel 190 will run idle upon the end of the shaft 191, except when the operator by means of a foot-treadle 199, Fig. 2, moves the belt-wheel 190 against the clutch member 197, and when this is done the belt-wheel 190, clutch member 197, and shaft 191 will rotate together and the entire machine will operate. The foot-treadle 199, Fig. 2, is connected by a pitman-rod 200 and bell-crank lever 201 with the rod 202, Fig. 16, disposed within the shaft 191 and connected with a collar pressing upon the outer face of the belt-wheel 190. When the pressure of the foot of the operator is exerted against the treadle 199, the rod 202 will move inward toward the left and cause the belt-wheel 190 to be firmly pressed against the clutch member 197, so that said belt-wheel and clutch member may rotate together. When the foot of the operator is removed from the foot-treadle 199, the springs 198, pressing against the belt-wheel 190, will move the latter outward to the right from the clutch member 197, thus cutting off the power from the machine and causing the latter to come to a stop. The weight of the foot-treadle 199 is normally relieved from acting through the rod 202 on the belt-wheel 190 by means of a spring 203, Fig. 2, which yieldingly supports the heavier end of the foot-treadle.

In the operation of the machine the foot is placed upon the foot-treadle 199 so as to set the machine in motion, and the operator will retain his foot upon this foot-treadle until the entire mold-board 148 has been filled with cigar-bunches, and thereupon the operator will remove his foot from the foot-treadle and allow the machine to come to a rest, so that the filled mold-board may be removed and an empty mold-board substituted therefor. The machine may also be stopped at any time for any cause whatever by the removal of the foot of the operator from the foot-treadle 199.

The operation of the machine hereinbefore described has been somewhat fully explained in connection with the description of the construction of the said machine, and therefore it would seem that only a brief further description of the operation is required.

Figs. 5 and 5ª illustrate the operative parts of the machine in their normal at-rest position, which is the position said parts assume at the end of each rotation of the central power-shaft 122. With each rotation of the central power-shaft 122 one bunch is rolled and delivered to the mold-board 148, said mold-board is moved one step forward and the receiver 183 descends with a charge of tobacco and deposits the same in the pocket 93 of the rolling-apron 92 and ascends to its upper position, the entire machine at the end of each rotation of the central power-shaft 122 assuming the condition in which it is shown in Figs. 4 to 5ª, inclusive. The machine may be arrested at the end of each rotation of the central power-shaft 122 by the removal of the foot of the operator from the foot-treadle 199, or said machine may be arrested at any other time by the like operation, but will preferably only be brought to a stop when the mold-board 148 is filled with bunches and it is desired to remove the same and substitute an empty mold-board therefor. Thus at the end of each rotation of the central power-shaft 122 the parts are in the position illustrated in Figs. 4 to 5ª, inclusive, and a charge of filler-tobacco has been deposited in the pocket 93 of the apron 92. Thereupon the operator will, as above described, place a binder upon the apron 92 and in position for its front edge to lap into the front edge of the said pocket 93. The machine being in motion or if at rest being put into motion by the pressure of the foot of the operator upon the treadle 199 the pocket-closing plate 137 will move frontward, closing the pocket 93 upon the charge of filler-tobacco therein and causing the upper edges of said pocket when closing to pinch the then rear edge of the binder, so as to hold the latter. The roller 127 will then proceed onward, rolling the filler-tobacco into the binder and forming the bunch, the bunch being rolled over the thin steel rolling-bed 125 and into the then open funnel 145, whereupon the roller 127 will return to its rear position. Upon the depositing of the rolled bunch into the funnel 145 at the front end of the rolling-table the arms 157, carrying the plunger 146, will start to descend, and the tramway-frame 150 will start to ascend toward said funnel 145. When the arms 157, carrying the plunger 146, start to descend, the upper edges of the cams 156, formed on said arms, will by riding against the rollers 158 on the slides 154 cause the front plate 152 of said funnel 145 to move rearward for the purpose of closing the lower end of the funnel 145, this closing of the funnel 145 taking place just immediately before one of the open molds 147 of the mold-board 148 passes upon the lower end of said funnel. The closing of the lower end of the funnel 145 takes place during the first part of the downward motion of the arms 157, carrying the plunger 146, and hence said funnel remains closed at its lower end for only a sufficient length of time for one of the molds 147 of the mold-board 148 to pass upon the said lower end of said funnel 145. By the time the mold-board 148 has ascended and moved one of its empty molds 147 to encompass the lower closed end of the funnel 145 the cams 156 on the arms 157 will have passed downward below the rollers 158 on the slides 154, and the front plate 152 will thereupon immediately move toward the front and open the funnel 145, the latter remaining in its open condition during the rest of the descent of the plunger 146 by reason of the fact that the upper portions of the said arms 157 have parallel edges. Thus when the plunger 146 is acting to push the bunch through the funnel 145 and into the mold 147 of the mold-board 148 the funnel 145 will be in its open position. After the plunger 146 has pushed the bunch from the funnel 145 and pressed it into the mold 147 of the mold-board 148 the arms 157 will ascend and carry the plunger 146 to its upper position and the mold-board 148, supported upon the tramway 150, will descend to its lower position clear of the funnel 145, and thereupon the mold-board 148 will advance one space frontward, so as to carry an empty mold 147 directly below the funnel 145 to receive the next bunch to be rolled. The arms 157, carrying the plunger 146, will almost reach their upper position before the mold-board 148 descends in order that the upper ends of the cams 156 may operate, through the rollers 158, to close the lower end of the funnel 145 before the mold-board 148 descends. There are especial reasons for the closing and opening of the funnel 145 in the manner above described, and in the main they are to insure the proper delivery of the bunch in the proper condition into the mold of the mold-board 148 and to prevent the edges of the molds in the wooden mold-board 148 from being chipped off by the lower edges of the funnel 145. The funnel 145 is in its open position to conveniently receive the bunch from the rolling-apron 92, and then the funnel 145 closes, so that upon the ascent of the mold-board 148 the mold 147 in the latter may readily pass upon the lower end of the funnel without the latter splintering or chipping off the edges of the mold. Thereupon the funnel 145 is opened, so that the edges of the plates 151 and 152 may pass against the upper edges of the opposite side walls of the said mold, whereby the bunch is enabled to be properly and in good condition delivered into the said mold. The plunger 146 then ascends through the open funnel 145 without jar or friction, and thereupon and just as the plunger 146 is reaching its upper position the upper ends of the cams 156 will close the funnel 145, so that the lower edges of said funnel may be released from the walls of the mold 147 just as the mold-board 148 starts to descend, thereby preventing the edges of the mold 147 from binding against the lower edges of the funnel 145 when it is desired that the mold-board 148 shall descend, so as to be clear of the funnel 145 and be able to move one step onward. Just after the funnel 145 closes to become freed from the mold 147 in the mold-board 148 the plunger 146 will have reached its upper position and the cams 156 will attain the relation to the rollers 158 illustrated in Fig. 5ª, so that when the plunger 146 is just reaching its extreme upward position the cams 156 will operate, through the rollers 158, to again open the funnel 145, leaving the latter in its normal condition ready to receive the next bunch which may be rolled frontward over the rolling-bed 125. The means for operating the arms 157, carrying the plunger 146, and the means for raising and lowering the mold-board 148 and advancing the same step by step forward as said mold-board becomes filled with the bunches have been fully described hereinbefore. During the period that the rolled bunch is being delivered from the funnel 145 to the mold-board 148 and the plunger 146 is returning to its upper position and said mold-board is advancing one step forward the roller 127 will return to its position at the rear of the recess 90 in the bed-frame 91, the plunger 56 in the main hopper 51 will descend to complete the pressing of a charge of filler-tobacco into the pocket 57 of the charge-carrier 53, the charge-carrier 53 will turn frontward and the charge of filler-tobacco will be ejected into the receiver 83, and said receiver 83 will descend, causing the frame 100 to form the pocket 93 in the rolling-apron 92 and then delivering its charge of tobacco into the said pocket 93, so that the machine may be in condition to immediately be operated for the formation of another bunch, the charge-carrier 53 and receiver 83 of course returning to their normal position prior to the commencement of another rotation of the middle or central driving-shaft 122. Just prior to the starting of the roller 127 to roll the bunch the pocket-closing plate 137 starts forward to close the pocket 93, as above described, and after the roller 127 has gotten into the proper position over the pocket 93 to effect the rolling of the bunch the said plate 137 moves rearward and opens the recess 90 in the rolling bed-frame 91.

It has been mentioned above that during the return of the roller 127 to its rear position the plunger 56 in the main hopper 51 will elevate and descend to aid in pressing the charge of filler-tobacco into the pocket 57 of the charge-carrier 53, and it is desired here to call attention to the fact that on each starting of a rotation of the central driving-shaft 122 the said plunger 56 will again descend. Thus on the starting of the machine to roll a bunch (the charge of filler-tobacco then being in the pocket 93 of the rolling-apron 92) the plunger 56 will elevate and descend to press a charge of filler-tobacco into the pocket 57 of the charge-carrier 53, and just prior to the end of each rotation of the central power-shaft 122 the said plunger 56 will for a second time elevate and descend, so as to complete the pressing of the charge of filler-tobacco in the pocket 57 of the charge-carrier 53, said charge-carrier 53 prior to the completion of the rotation of the central power-shaft 122 turning forward to deliver said charge of filler-tobacco to the receiver 83 and returning to its initial position. During one rotation of the central driving-shaft 122 the plunger 56 thus makes two descents for pressing the charge of filler-tobacco into the pocket 57 of the charge-carrier 53, whereby the operator may be assured of the proper delivery in suitable condition of a charge of filler-tobacco into the pocket 57 and the transfer of said charge to the pocket 93 of the apron 92 with each rotation of the central power-shaft 122. The agitator-pins 55 in the main hopper 51 also elevate and descend two times during each rotation of the central driving-shaft 122, and hence the tobacco in the hopper 51 is prevented from packing and is maintained in suitable condition for the effective operation of the plunger 56.

The plates 151 and 152 constitute the funnel 145 and have converging lower portions, and this is a feature of importance, since with the funnel 145 constructed as shown and described I am enabled not only to prevent the chipping of the mold-board 148, but to deliver the bunches to said mold-board in the proper condition and without distorting by flattening the shape of the bunches. The form of the funnel 145 is also such that when its front and rear plates are closed together the molds of the mold-board 148 will freely pass upon the lower end of the funnel even though, due to a limited wear or looseness of the parts, the mold in the mold-board might have become slightly out of accurate register with the funnel.

The small rod 128, between which and the roller 127 the apron 92 passes, is employed to keep the apron flat against the roller 127 and to prevent any puckering of the edges of said apron during the operation of rolling a bunch. The rod 128 is centrally in front of the roller 127, as shown in Fig. 11, in which position it is entirely effective in keeping the apron flat and also in keeping the binder flat and in condition to be rolled around the filler-tobacco.

The operation of the wiper 73, located at the lower front edge of the main hopper 51, has been sufficiently described hereinbefore, and at this place it is only necessary to note that the lower surface of the wiper 73 is concave to conform to the exterior surface of the charge-carrier 53 and that the inner edge of the wiper 73 is beveled or sharpened, as shown in Fig. 5, to effectually prevent any undue quantity of filler-tobacco from being carried frontward by the charge-carrier 53.

What I claim as my invention, and desire to secure by Letters Patent, is—

1. In a cigar-machine, the bunch-rolling mechanism, the elevated hopper for filler-tobacco, and the charge-carrier below said hopper and having the pocket to receive a charge of filler-tobacco from said hopper for a bunch, said charge-carrier being adapted to be moved to carry said pocket from below said hopper and to a position to discharge the said charge of filler-tobacco, combined with means for actuating said charge-carrier, means for ejecting the charge of filler-tobacco therefrom when said pocket is moved from below said hopper, the plunger for pressing the filler-tobacco into said pocket, and means operable from the driving-shaft for imparting to said plunger a plurality of movements against the filler-tobacco for pressing the charge of the same into said pocket; substantially as set forth.

2. In a cigar-machine, the bunch-rolling mechanism, the elevated hopper for filler-tobacco, and the charge-carrier below said hopper and having the pocket to receive a charge of filler-tobacco from said hopper for a bunch, said charge-carrier being adapted to be moved to carry said pocket from below said hopper and to a position to discharge the said charge of filler-tobacco, combined with means for actuating said charge-carrier, means for ejecting the charge of filler-tobacco therefrom when said pocket is moved from below said hopper, the plunger for pressing the filler-tobacco into said pocket, the springs for affording a yielding resistance to said plunger, agitators for acting upon the tobacco within said hopper, means operable from the driving-shaft for imparting motion to said agitators, and means operable from the driving-shaft for imparting to said plunger a plurality of movements against the filler-tobacco for pressing the charge of the same into said pocket; substantially as set forth.

3. In a cigar-machine, the bunch-rolling mechanism, the elevated hopper for filler-tobacco, and the charge-carrier below said hopper and having the pocket to receive a charge of filler-tobacco from said hopper for a bunch, said charge-carrier being adapted to be moved to carry said pocket from below said hopper and to a position to discharge the said charge of filler-tobacco, combined with means for actuating said charge-carrier, means for ejecting the charge of filler-tobacco therefrom when said pocket is moved from below said hopper, the plunger for pressing the filler-tobacco into said pocket, the slide 54 against the wall of said hopper and carrying the agitator-pins 55 for agitating the filler-tobacco within said hopper, and means operable from the driving-shaft for imparting vertical reciprocation to said slide, agitator-pins and plunger, whereby the filler-tobacco is prevented from packing and a proper charge therefor is pressed into said pocket by said plunger; substantially as set forth.

4. In a cigar-machine, the bunch-rolling mechanism, the elevated hopper for filler-tobacco, and the charge-carrier below said hopper and having the pocket to receive a charge of filler-tobacco from said hopper for a bunch, said charge-carrier being adapted to be moved to carry said pocket from below said hopper and to a position to discharge the said charge of filler-tobacco, combined with means for actuating said charge-carrier, means for ejecting the charge of filler-tobacco therefrom when said pocket is moved from below said hopper, the plunger for pressing the filler-tobacco into said pocket, and means operable from the driving-shaft for actuating said plunger to move against the filler-tobacco for pressing the charge of the same into said pocket, the mechanism being so timed that the said plunger will make a plurality of movements against the filler-tobacco and then remain in its lower position while said charge-carrier is moving to carry its said pocket from below said hopper to the point of discharging; substantially as set forth.

5. In a cigar-machine, the bunch-rolling mechanism, the elevated hopper for filler-tobacco, the oscillatory charge-carrier 53 below said hopper and having the pocket 57 to receive a charge of filler-tobacco for a bunch, the movable bottom 77 for said pocket 57, means for turning said charge-carrier to move said pocket from below said hopper to its discharging position, means for moving said bottom 77 to eject the charge of filler-tobacco when said carrier is turned to carry said pocket from below said hopper, and the wiper 73 for preventing an excess of tobacco from being moved outward by said charge-carrier, combined with the yielding plunger 56 within said hopper for pressing the filler-tobacco into said pocket, and means for operating said plunger; substantially as set forth.

6. In a cigar-machine, the bunch-rolling mechanism, the elevated hopper for filler-tobacco, the side brackets 52 sustaining said hopper above the bed-frame of the machine and having the cheek-pieces 74 below the lower end of said hopper, the oscillatory charge-carrier 53 mounted between said cheek-pieces and directly below the lower end of said hopper and having the pocket 57 to receive a charge of filler-tobacco for a bunch, the movable bottom 77 for said pocket, the plunger within the hopper for pressing the filler-tobacco into said pocket, and the wiper 73 for preventing an excess of tobacco from being carried from said hopper by said charge-carrier, combined with means for turning said charge-carrier to move said pocket 57 to its discharging position, and means for causing said bottom 77 to eject the charge of filler-tobacco from said pocket when the latter is in its discharging position; substantially as set forth.

7. In a cigar-machine, the bunch-rolling mechanism, the elevated hopper for filler-tobacco, the charge-carrier below said hopper and having the pocket to receive a charge of filler-tobacco from said hopper for a bunch, means for actuating said charge-carrier to move said pocket from below said hopper, and means for ejecting the charge of filler-tobacco from said pocket, combined with the receiver 83 for receiving the charge of filler-tobacco from said pocket and conveying the same to said bunch-rolling mechanism, means for moving said receiver 83 from its upper position where it receives the charge of filler-tobacco to its lower position where it delivers said charge to the rolling mechanism, and means for opening the lower end of said receiver for permitting the discharge of tobacco, said receiver having the converging front and rear walls, and the hinged door for permitting, when opened, the escape of filler-tobacco to the bunch-rolling mechanism; substantially as set forth.

8. In a cigar-machine, the bunch-rolling mechanism, the elevated hopper for filler-tobacco, the charge-carrier below said hopper and having the pocket to receive a charge of filler-tobacco from said hopper for a bunch, means for actuating said charge-carrier to move said pocket from below said hopper, and means for ejecting the charge of filler-tobacco from said pocket, combined with the receiver 83 for receiving the charge of filler-tobacco from said pocket and conveying the same to said bunch-rolling mechanism, means for moving said receiver 83 from its upper position where it receives the charge of filler-tobacco to its lower position where it delivers said charge to the rolling mechanism, and means for opening the lower end of said receiver for permitting the discharge of the tobacco therefrom, said receiver having the front and rear walls, the hinged door for permitting, when opened, the escape of the filler-tobacco to the bunch-rolling mechanism, and the spring for normally retaining said door in its closed position, the hinge for said door being about on a line with the upper edge of the rear wall of said receiver, and the front wall of said receiver extending above the horizontal plane of the rear wall thereof; substantially as set forth.

9. In a cigar-machine, the rolling-apron held at its opposite ends and normally slack, a bed supporting said apron and having a recess 90 below said apron, the roller 127 for coöperating with said apron in rolling the bunch, the elevated hopper for filler-tobacco, the charge-carrier below said hopper and having the pocket to receive a charge of the filler-tobacco from said hopper for a bunch, means for actuating said charge-carrier to move said pocket from below said hopper, and means for ejecting the charge of filler-tobacco from said pocket when the latter is in its discharging position, combined with the receiver 83 for receiving the charge of filler-tobacco from said pocket and conveying the same to said apron, means for moving said receiver from its upper position where it receives the charge of filler-tobacco to its lower position where it delivers said charge to said apron and then back to its upper position, the frame 100 carried by and projecting downward below the said receiver to precede the latter and form the pocket 93 by pushing the slack of the apron 92 into said recess 90, and means for opening the lower end of said receiver for permitting the escape of the tobacco into said pocket 93; substantially as set forth.

10. In a cigar-machine, the rolling-apron 92 held at its opposite ends and being normally slack so as to permit the formation therein of the pocket 93 to receive a charge of filler-tobacco, the bed-frame below said apron and having adjacent to one end of the latter the recess 90 through which the slack of the apron may be pressed to form said pocket, the roller 127 for coöperating with said apron in rolling the bunch, and means for reciprocating said roller, combined with the slide 137 in the rear of said recess 90, and means for moving said slide to close the pocket in the rolling-apron prior to the advance of said roller 127, and then withdrawing said slide to release said pocket when said roller 127 is in position with respect to said pocket to roll the bunch; substantially as set forth.

11. In a cigar-machine, the rolling-apron 92 held at its opposite ends and being normally slack so as to permit the formation therein of the pocket 93 to receive a charge of the filler-tobacco, the bed-frame below said apron and having adjacent to one end of the latter the recess 90 through which the slack of the apron may be pressed to form said pocket, the roller 127 for coöperating with said apron in rolling the bunch, and means for reciprocating said roller, combined with the slide-plate 137 mounted on said bed-frame in the rear of said recess 90 and having its upper surface about on the same horizontal plane with the upper surface of the bed supporting said apron, and means for moving said sliding plate 137 against the pocket in said apron to close said pocket against the rear edge of said bed in advance of the roller 127 and thereafter withdrawing said sliding plate 137 after said roller 127 has advanced sufficiently to effect the rolling of the bunch; substantially as set forth.

12. In a cigar-machine, the rolling-apron 92 held at its opposite ends and normally slack to permit of the formation of the pocket 93 therein to receive the charge of filler-tobacco for a bunch, the roller 127 for coöperating with said apron in rolling the bunch, and means for operating said roller, combined with the rolling-bed 125 below said apron and over which the bunch is rolled, said rolling-bed 125 being of thin sheet-steel yieldingly held at its opposite edges, whereby said bed 125 is enabled to yield to a limited extent under the pressure of the bunch being rolled; substantially as set forth.

13. In a cigar-machine, the bunch-rolling mechanism, the funnel 145 at the front end of the rolling-bed to receive the bunch from said rolling mechanism, the tramway-frame 150 below said rolling-bed and being pivotally secured at its rear end, the cams 174 engaging said frame 150 and supporting the same at its front end, means operable from the driving-shaft for actuating said cams 174 to elevate the front portion of said frame 150 at the proper time, the sliding frame 149 resting upon and guided by said frame 150, the mold-board 148 detachably secured upon said sliding frame 149, the rack 176 loosely connected with said frame 149, the pinion 178 in engagement with said rack, and means operable from the said driving-shaft for imparting through said pinion and rack an intermittent or step-by-step movement to said frame 149 and mold-board 148 upon said tramway-frame 150, combined with the plunger 146 for pressing the rolled bunch through said funnel 145 and into one of the molds of said mold-board 148, and means operable from the driving-shaft for moving said plunger 146 downward through said funnel and then back to its upward position, the timing of the mechanism being such that said tramway-frame 150 will elevate the mold-board 148 to the lower end of said funnel at the proper period to receive the bunch pressed through said funnel by means of said plunger; substantially as set forth.

14. In a cigar-machine, the bunch-rolling mechanism, the funnel 145 at the front end of the rolling-bed to receive the bunch from said rolling mechanism, the tramway-frame 150 below said rolling-bed and being pivotally secured at its rear end, the cams engaging and supporting said frame 150 at its front end, means operable from the driving-shaft for actuating said cams to elevate the front portion of said frame 150 at the proper time, the sliding frame 149 resting upon and guided by said frame 150, the mold-board 148 detachably secured upon said sliding frame 149, the rack 176 loosely connected with said frame 149, the pinion 178 in engagement with said rack, the strap 180 passing over the upper edge of said rack 176 and holding said rack in fixed relation to said pinion 178, and means operable from the driving-shaft for imparting through said pinion and rack an intermittent or step-by-step movement to said frame 149 and mold-board 148 upon said tramway 150, combined with the plunger 146 for pressing the rolled bunch through said funnel 145 and into one of the molds of said mold-board 148 and means operable from the driving-shaft for moving said plunger 146 downward through said funnel and then back to its upward position, the timing of the mechanism being such that said tramway-frame 150 will elevate the mold-board 148 to the lower end of said funnel at the proper period to receive the bunch pressed through said funnel by means of said plunger, substantially as set forth.

15. In a cigar-machine, the bunch-rolling mechanism, the funnel 145 at the front end of the rolling-bed to receive the bunch from said rolling mechanism, the tramway-frame 150 below said rolling-bed and pivotally secured at its rear end, the cams engaging and supporting said frame 150 at its front end, means operable from the driving-shaft for actuating said cams to elevate the front portion of said frame 150 at the proper time, the sliding frame 149 resting upon and guided by said frame 150 and having the raised rear end 167 and front clamping-screw 168, the mold-board 148 detachably secured upon said sliding frame 149 by means of the said screw 168, the rack 176 loosely connected with said sliding frame 149, the pinion 178 in engagement with said rack, and means operable from the driving-shaft for imparting through said pinion and rack an intermittent or step-by-step movement to said frame 149 and mold-board 148 upon said tramway-frame 150, combined with the plunger 146 for pressing the rolled bunch through said funnel 145 and into one of the molds of said board 148, and means operable from the driving-shaft for moving said plunger 146 downward through said funnel and then back to its upward position, the timing of the mechanism being such that said tramway-frame 150 will elevate the mold-board 148 to the lower end of said funnel at the proper period to receive the bunch pressed through said funnel by means of said plunger, substantially as set forth.

Signed at New York, in the county of New York and State of New York, this 28th day of May, A. D. 1901.

JULIUS H. SCHMIDT.

Witnesses:
CHAS. C. GILL,
GUNDER GUNDERSON.